United States Patent
Kakumani et al.

(10) Patent No.: US 12,519,766 B2
(45) Date of Patent: *Jan. 6, 2026

(54) IDENTITY EXPERIENCE FRAMEWORK

(71) Applicant: Microsoft Technology Licensing, LLC, Redmond, WA (US)

(72) Inventors: Raja Charu Vikram Kakumani, Redmond, WA (US); Brandon B. Murdoch, Reading (GB); Ronald Bjones, Dilbeek (BE); Muhammad Omer Iqbal, Redmond, WA (US); Kim Cameron, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,173

(22) Filed: Apr. 18, 2024

(65) Prior Publication Data
US 2024/0267366 A1    Aug. 8, 2024

Related U.S. Application Data

(63) Continuation of application No. 15/809,621, filed on Nov. 10, 2017, now Pat. No. 11,997,077.

(51) Int. Cl.
*H04L 9/00*     (2022.01)
*H04L 9/40*     (2022.01)
*G06F 3/0484*   (2022.01)

(52) U.S. Cl.
CPC ............ *H04L 63/08* (2013.01); *G06F 3/0484* (2013.01); *H04L 63/0815* (2013.01); *H04L 63/20* (2013.01); *H04L 2463/082* (2013.01)

(58) Field of Classification Search
CPC ..... H04L 63/08; H04L 63/0815; H04L 63/20; H04L 2463/082; G06F 3/0484
See application file for complete search history.

(56) References Cited

U.S. PATENT DOCUMENTS

2018/0075231 A1*  3/2018 Subramanian ...... H04L 63/0807

OTHER PUBLICATIONS

Communication under Rule 71(3) received in European Application No. 18743202.6, mailed on May 14, 2021, 7 pages.

(Continued)

*Primary Examiner* — Syed M Ahsan
(74) *Attorney, Agent, or Firm* — Weaver IP L.L.C.

(57) ABSTRACT

Methods for composable user journeys for user authentication via an identity experience framework are performed by systems and apparatuses. Initiating a user authentication process for an application triggers application calls for dynamic invocation of a specific identity policy, required by the application, of a number of identity policies managed by a host of the identity experience framework. User interfaces defined by the identity policies are provided from the host to the application for interaction by the user and entry of identity information needed to authenticate the user according to specified verification providers. Identity claims and token requests are provided from the application to the host which then authenticates the identity claims via the verification providers and mints a token that includes the claims required by the application, according to the identity policy. The application consumes the token to complete the token request and allow the user access to the application.

20 Claims, 9 Drawing Sheets

(56) References Cited

OTHER PUBLICATIONS

Decision to grant a European patent pursuant to Article 97(1) received in European Application No. 18743202.6, mailed on Aug. 26, 2021, 2 pages.
Notice of Allowance mailed on Dec. 3, 2019, in U.S. Appl. No. 15/809,651, 8 pages.
Notice of Allowance mailed Sep. 10, 2020, in U.S. Appl. No. 15/866,130, 18 pages.

* cited by examiner

IDENTITY EXPERIENCE FRAMEWORK

CROSS REFERENCE TO RELATED APPLICATION(S)

This application claims priority to and is a continuation of U.S. patent application Ser. No. 15/809,621, filed on Nov. 10, 2017, the entirety of which is incorporated by reference herein.

This application is related to U.S. patent application Ser. No. 15/809,651, filed on Nov. 10, 2017, and entitled "Identity Experience Framework," now issued on Mar. 31, 2020 as U.S. Pat. No. 10,609,082, the entirety of which is incorporated by reference herein.

BACKGROUND

Identity features are ubiquitous across all applications used by end users. Features such as authentication based on username or email address and password, multi-factor authentication, and federation are used for application sign up, authentication, and access. Even so, current identity solutions are rife with examples where many different application developers are providing their own implementations for identity verification.

The needs of workloads for companies and governments vary widely, where the variations are unique enough that they require custom-built solutions. Workloads span from a website or mobile application interacting with consumers, to large scale application platforms that offer a built-in identity systems for developers building applications, to dynamic portal teams such as consumer portals created via wizards.

Digital transformation in the modern world has reached a point where every industry (not just software) and even governments are increasingly engaging with their customers and citizens digitally. Higher value transactions such as buying health insurance, managing health vaults, finances, paying taxes, requesting welfare benefits, etc., are moving to online implementations. Companies also need to handle the vetting of software developers for application ("app") stores before payouts can be made. Currently, each of these issues are achieved by custom-built solutions.

SUMMARY

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

Methods for composable user journeys for user authentication via an identity experience framework are performed by systems and apparatuses. Initiating a user authentication process for an application triggers application calls for dynamic invocation of a specific identity policy, required by the application, of a number of identity policies managed by a host of the identity experience framework. User interfaces defined by the identity policies are provided from the host to the application for interaction by the user and entry of identity information needed to authenticate the user according to specified verification providers. Identity claims and token requests are provided from the application to the host which then authenticates the identity claims via the verification providers and mints a token that includes the claims required by the application, according to the identity policy. The application consumes the token to complete the token request and allow the user access to the application.

By way of example, a system is described herein. The system may be configured and enabled in various ways to provide composable user journeys for user authentication, and the system may perform its functions according to an identity experience framework, as described herein. The system includes a memory(ies) configured to store program logic, and also includes a processor(s) configured to access the memory and to execute the program logic. In the system, the program logic includes communication logic and policy executor logic. The communication logic is configured to receive a call from an application, the call indicating or specifying an identity policy that is one of a plurality of identity policies for dynamic deployment on behalf of the application, and to receive a token request and an identity claim responsive to user interaction with a user interface (UI) associated with the identity policy and provided for the application. The policy executor logic is configured to execute a user authentication process that is defined by the identity policy and that includes providing the UI to the application. The policy executor logic is also configured to verify the identity claim and provide a token to the application for consumption, via the communicator logic, to complete the token request.

By way of further example, a method is described herein. The method may include steps for providing a composable user journey for user authentication, according to an identity experience framework, as described herein. The method may be implemented by a computing system that comprises a multi-sided identity experience framework configured to support a plurality of remote identity operators, a plurality of remote verification providers, and a plurality of remote application service providers for user authentication to applications. The method includes receiving a call from an application, the call indicating or specifying an identity policy of a plurality of identity policies for dynamic deployment on behalf of the application, and executing a user authentication process that is defined by the identity policy and that includes providing a user interface (UI) defined by the identity policy that is called by the application and that is configured in accordance with one or more verification providers specified by the identity policy. The method also includes receiving a token request and an identity claim responsive to user interaction with the UI, verifying the identity claim, and providing a token to the application for consumption to complete the token request.

By way of another example, a computer-readable storage medium is described herein that comprises computer-executable instructions that, when executed by at least one processor, perform a method. The method may include steps for providing a composable user journey for user authentication, according to an identity experience framework, as described herein. The method may be implemented by a computing system that embodies or accepts the computer-readable storage medium. The computing system may comprise a multi-sided identity experience framework configured to support a plurality of remote identity operators, a plurality of remote verification providers, and a plurality of remote application service providers for user authentication to applications. In an embodiment, the method includes receiving a call from an application, the call indicating or specifying an identity policy of a plurality of identity policies for dynamic deployment on behalf of the application, and executing a user authentication process that is defined by the identity policy and that includes providing a user interface (UI) associated with the identity policy to the application. The method also includes receiving a token request and an identity claim responsive to user interaction with the UI, verifying the identity claim, and providing a token to the application for consumption to complete the token request.

Another example system is described herein. The system may be configured and enabled in various ways to provide composable user journeys for user authentication, and the system may perform its functions according to an identity experience framework, as described herein. The system includes a memory(ies) configured to store program logic of an application, and also includes a processor(s) configured to access the memory and to execute the program logic and the application. The system may be configured to develop and/or deploy the application. In the system, the program logic includes user interface (UI) logic, policy logic, and identity claim and token logic. The UI logic is configured to display a verification UI associated with an identity policy, and the policy logic is configured to generate a call to an identity policy host, the call indicating or specifying the identity policy, that is one of a plurality of identity policies, for dynamic deployment of the verification UI for the application. The identity claim and token logic is configured to generate a token request and an identity claim of a user responsive to a first user interaction that is with the verification UI, and to consume a token from the identity policy host subsequent to generating the token request to allow access by the user to at least one feature of the application.

Another example method is described herein. The method may include steps for providing a composable user journey for user authentication, according to an identity experience framework, as described herein. The method may be implemented by a computing system that interacts with a multi-sided identity experience framework configured to support a plurality of remote identity operators, a plurality of remote verification providers, and a plurality of remote application service providers for user authentication to applications. The method includes generating and providing a call to an identity policy host, the call indicating or specifying an identity policy, that is one of a plurality of identity policies, for dynamic deployment of a verification user interface (UI) for the application. The method also includes displaying the verification UI associated with the identity policy, and generating and providing a token request and an identity claim of a user responsive to a first user interaction that is with the verification UI. The method further includes consuming a token from the identity policy host subsequent to generating the token request to allow access by the user to at least one feature of the application.

Another example computer-readable storage medium is described herein that comprises computer-executable instructions that, when executed by at least one processor, perform a method. The method may include steps for providing a composable user journey for user authentication, according to an identity experience framework, as described herein. The method may be implemented by a computing system that embodies or accepts the computer-readable storage medium. The computing system may interact with a multi-sided identity experience framework configured to support a plurality of remote identity operators, a plurality of remote verification providers, and a plurality of remote application service providers for user authentication to applications. In an embodiment, the method includes generating and providing a call to an identity policy host, the call indicating or specifying an identity policy, that is one of a plurality of identity policies, for dynamic deployment of a verification user interface (UI) for the application. The method also includes receiving the verification UI, or an identifier thereof, responsive to the call, and displaying the verification UI associated with the identity policy. The method further includes generating and providing a token request and an identity claim of a user responsive to a first user interaction that is with the verification UI, and receiving the token responsive to providing to the token request. The method additionally includes consuming a token from the identity policy host subsequent to generating the token request to allow access by the user to at least one feature of the application.

These and other objects, advantages and features will become readily apparent in view of the following detailed description of examples of the invention. Note that the Brief Summary and Abstract sections may set forth one or more, but not all examples contemplated by the inventor(s). Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate examples of the present application and, together with the description, further explain the principles of the example embodiments and to enable a person skilled in the pertinent art to make and use the example embodiments.

Figure 1:
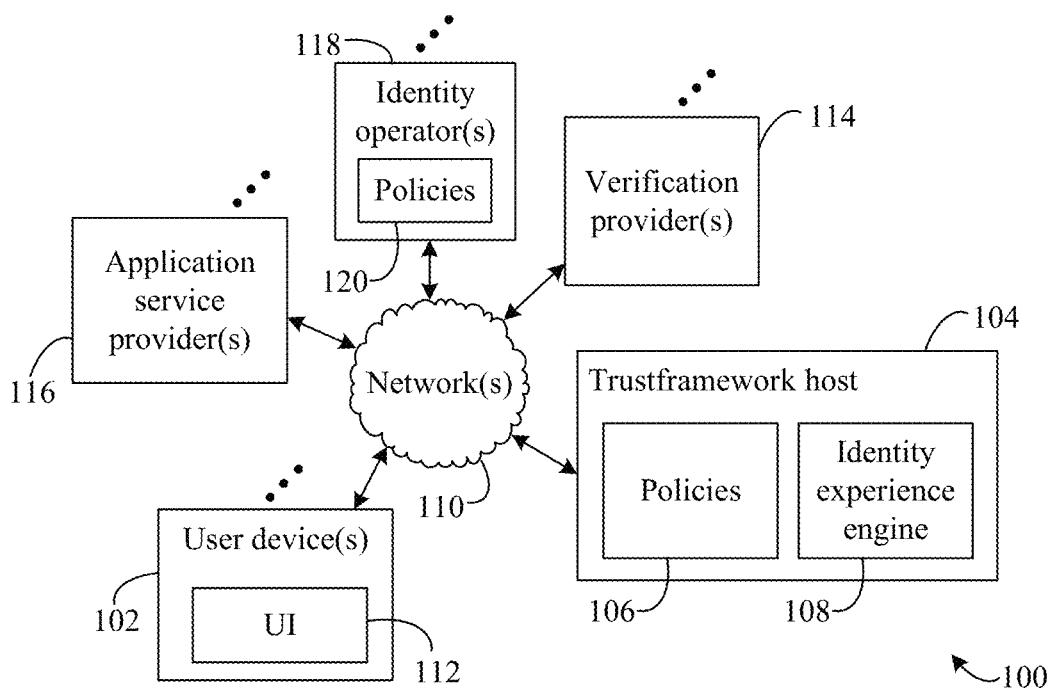
FIG. 1 shows a block diagram of a networked system for composable user journeys using an identity experience framework, according to an example embodiment.

The features and advantages of the examples described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous embodiments. The scope of the present patent application is not limited to the disclosed embodiments, but also encompasses combinations of the disclosed embodiments, as well as modifications to the disclosed embodiments.

References in the specification to "one embodiment," "an example embodiment," "an example," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Section II below describes example embodiments for an identity experience framework. In particular, Subsection II.A describes example embodiments for identity experience framework hosts, and Subsection II.B describes example application service provider embodiments.

Section III below describes an example mobile device that may be used to implement features of the embodiments described herein.

Section IV below describes an example processor-based computer system that may be used to implement features of the embodiments described herein.

Section V below describes some additional examples and advantages.

Section VI provides some concluding remarks.

II. Example Embodiments

The example techniques and embodiments described herein are provided for illustrative purposes, and are not limiting. The embodiments described herein may be adapted to any type of electronic and/or processing device, as well as systems thereof. Further structural and operational embodiments, including modifications/alterations, will become apparent to persons skilled in the relevant art(s) from the teachings herein.

The techniques and embodiments described herein provide an identity experience framework (IEF) that allows for seamless user experiences from applications, such as but not limited to, composable user journeys for application sign-in, application sign-up, step-up, authentication, and/or access. For example, the conventional solutions noted in the Background Section above do not provide a seamless user experience across applications, but the techniques and embodiments described herein are interoperable with existing systems and leverage their value while at the same time providing the ability to override or extend specific variations of existing systems. The described IEF provides a platform for businesses, application providers, governments, and/or the like, to essentially define and operate their own identity systems.

In order to enable rich digital transactions based on true identity and background checks, the described IEF provides a marketplace for claims and attribute providers to offer their services and for application developers to consume these services via the IEF. At the same time, the IEF provides a surface area for one to define their identity system(s) that caters to a specific need and to offer that as a service. The IEF is configured to provide a multi-sided platform to bring together identity operators, claims and attribute providers, and application service providers. The identity operators offer their expertise in identity systems via the IEF. Traditionally these are system integrators and independent software vendors that purpose-build an identity solution. The claims providers, attribute providers, etc., herein referred to generally as "verification providers," provide their unique values such as, but without limitation, social security verification, credit checks, national biometric identities, GSM providers, etc. Application service providers (or application developers) offer value-added services and applications to the end users.

The described IEF utilizes trustframework policies (e.g., identity policies) that allow an identity expert to compose an identity system with desired, identity-specific user journeys. Within the IEF, a single trustframework policy may provide a basis for some or all of business-to-consumer functionality, business-to-business functionality, business-to-employee functionality, and/or the like. In this way, different identity protocols are leveraged to provide a seamless, centralized solution. The IEF may include commonly-used verification providers "out of the box" to be invoked via the trustframework policy. For instance, these verification providers may include, but are not limited to, an email address validation provider, an identity provider (IdP) for local accounts, a multi-factor authentication provider, a self-asserted provider, Azure® Active Directory® from Microsoft Corporation of Redmond, WA (as a user directory provider), etc. A relying party, e.g., an application or application service provider, calls an identity policy for invocation and subsequent execution of a user authentication process. In embodiments, any identity policy of an included identity provider may be designated or identified as a default policy if no specific policy is specified in a call from an application to the IEF. Accordingly, the relying party chooses the user journey to enforce for the current request, and chooses the list of claims the application requires as part of the token needed to authenticate the user and allow access.

A claim, or an identity claim, is an assertion about the identity of a user that is made by an entity. Claims are generally understood as currency that flows through the orchestration steps and becomes part of a token sent back to the application for consumption that allows a user access to a part(s) of the application. Claims are referenced from within a technical profile of an identity policy. User journey behaviors define the semantics of the session life time, token life time, etc.

As referred to herein, a user journey is an identity experience a user goes through, e.g., to sign-in to, or sign up for, an application or service, be authenticated therefor, or obtain access thereto. Put another way, a user journey defines the business logic of what an end user goes through as a trustframework engine processes an authentication request, described in further detail below. A user journey is expressed as a series of orchestration steps that may be composed according to the specifications of the application service provider. Orchestration steps can be an identity provider selection, the minting of a token, the performance of a claims exchange, and/or the like. A claims exchange is a way to express an interaction with a specific verification provider. While example embodiments herein may be described in the context of claims providers, the verification providers herein may be modeled as claims providers and references to verification providers and claims providers may be interpreted as any type of verification provider. Every orchestration step of a user journey may be modeled as a claims exchange, according to embodiments.

Multiple applications may use a given identity policy, in embodiments. Each such application may receive the same token (with claims), and the end user will go through the same user journey. Conversely, a single application may use multiple identity polices, according to embodiments. This allows the application to achieve functionality such as basic sign-in, step up, sign-up, etc., according to the IDF and the trustframework. User journeys may also be utilized for account linking, profile management, etc.

A technical profile defines the actual semantics of a specific verification provider and is referenced from a claims exchange step in a user journey. Connection-specific metadata and claims at play are defined in a technical profile. A claims provider or verification provider may have multiple technical profiles under the IEF. Each technical profile defines a specific contract for federating with that provider. A technical profiles may include, without limitation, a protocol, metadata, cryptographic references, input/output claims, and/or input/output claims transformations. Protocols may be, for example, open authorization (e.g., Oauth2.0), Security Assertion Markup Language (SAML), OpenID Connect (OIDC), etc.), and cryptographic references may include a references to secrets in a tenant/customer secret store. Input/output claims may comprise a list of the claims a provider may expect in request and/or respond with and their mappings from a partner claim type to the claims used in the identity policy.

Input/output claims transformations reference the claims transformations defined in the identity policy, where input transforms are run prior to sending the authentication request to the verification provider(s), and output transforms are run upon receiving the response claims from the verification provider(s). Claims transformations include transforms that may be defined using supported transform methods (i.e., methods, rules, etc.), and that may utilize one or more parameters associated with identity policy, with the user, and/or the like. As an illustrative example, an Identifier Transform method/rule may take an identity claim for an identifier of the user and create a pseudonym identifier based on the identifier identity claim and other user information. Transform methods may include, without limitation, the transform methods shown below in Table 1:

TABLE 1

Transform Methods

| Transformation Method | Example Transformations defined in policies |
| --- | --- |
| PseudonymousIdentifier | CreatePseudonymousIdentifier |
| FormatStringClaim | CreateUserPrincipalName, CreateUserId, CreateMailNickName, CreateDisplayName |
| CreateDoNotTrackId | CreateDoNotTrackId CreateDoNotTrackIdForDirectory CreateDoNotTrackIdForRP |
| IsAgeOver | IsAgeOver18Years |

Accordingly, the IEF embodiments and techniques provide the ability to invoke transformations that take parameters (e.g., zero or more) and claims to generate new identity claims as part of the user journeys described herein.

Building blocks, as used herein, may include claims schema, claims transformations, and content definitions that are used elsewhere in an identity policy. Claims schema list identity claims that are dealt with in the identity policy. These are referenced by a ClaimTypeReferenceId from other places in the policy such as input/output claims of a technical profile as well as transformations.

Content definitions define user experience elements and are referenced by any orchestration step that provides a UI or any verification provider showing a UI. Content definitions may define the HTML and page template (e.g., "XXX.api.xml"), e.g., extensible markup language (XML) file, etc.

Many different orchestration steps may be performed during composable user journeys according the IEF described herein. These orchestration steps may reference verification providers and building blocks allowed in a given policy. In embodiments, orchestration steps that are responsible to show end-user UIs also have references to the corresponding content definition ID for the policy. The following is a non-exhaustive list of orchestration steps: IdPSelection, federation with an IdP, reading/writing to a directory provider, reading/writing to an attribute provider, collecting user asserted attributes, step-up with multi-factor authentication (MFA), consent screens, and sending claims.

IdPSelection may include the display of a home realm discovery (HRD) screen, and may be required when multiple IdPs are supported for different policies in the IEF. For example, in a business-to-consumer case, a policy may allow a user to bring his/her existing identity from their Facebook® social media account (from Facebook, Inc., of Menlo Park, CA), their Gmail® web services account (from Google, Inc., of Mountain View, CA), or their Office 365® account (from Microsoft Corporation of Redmond, WA).

An orchestration step for federation with an IdP may be performed if there is a single IdP available for use or when the IdPSelection described above provides the IdP selection. Federation may be modeled as a claims exchange step, according to embodiments.

For reading/writing to a directory provider, directory providers may also be modeled as claims providers in embodiments, and accordingly, this step may also be modeled as a claims exchange. Similarly, reading/writing to an attribute provider may also be modeled as a claims exchange because attribute providers may be modeled as claims providers.

Orchestration steps for collecting user asserted attributes may be performed if customers desire to collect user-entered information in the authentication flows for user journeys. For instance, in a business-to-consumer case, application-specific information may be collected during a 'Sign Up' user journey. Self-asserted attributes claims providers may also be modeled as a claims exchange, and associated information may be collected by customers. In embodiments, these orchestration steps involve displaying one or more UIs.

Orchestration steps for 'step up' with MFA, e.g., via telephone, using a phonefactor-proxy provider may also be modeled as claims providers and accordingly as a claims exchange step. In order to call the phone of a user or to allow phone input during registration for an application, this orchestration step also shows a UI(s).

A consent screen step shows a consent screen with a list of claims being sent to the application, and this type of orchestration step also shows a UI(s).

In a send claims orchestration step, a token is constructed with claims according to the relying party request, and a response with the token is provided back to the relying party application.

As noted above, an application service provider (a customer or tenant of the IEF) may leverage the IEF compatibilities with a wide range of identity systems with desired, identity-specific user journeys. Accordingly, the described IEF provides additional value to customers through its composability and variability. For instance, as a non-limiting, illustrative example scenario, a customer may choose to consider the login username or social security number (SSN) of a user to be personally identifiable information (PII) that cannot be stored in the cloud. Additionally, the customer may configure their user journey to call an endpoint to compute the hashed username/SSN value that is used with a security token service (STS) and Microsoft® Online Directory Service (MsoDS) from Microsoft Corporation of Redmond, WA. Additionally, the customer may call their user profile endpoint on new user sign-ups to initiate necessary customer relationship management (CRM) workflows.

The trustframework policies or identity policies described herein may support full inheritance with polymorphic references. That is, a customer may create a derived policy that can leverage the entire functionality of a parent policy and override one or more specific policy aspects. This could affect an entire user journey, or just a single string. Conversely, full inheritance and polymorphic references enables the identity operator to offer their trustframework for others to instantiate and use. For example, the IEF business-to-consumer product functionality may be delivered via a single trustframework policy, or base policy, that utilizes a management portal to instantiate derived business-to-consumer policies. That is, user journeys and associated security semantics are declared and delivered as a single trustframework policy, and each customer may create a derived policy via the management portal to override or alter specific policy details.

With reference to the base trustframework policy, this is the policy under which an invoked policy is operational. In embodiments, the base trustframework policy may be applied across tenants of an IEF host, and also across non-tenant customers in some embodiments. The Trustframework policy engine ("trustframework engine" or "engine" herein) may include a policy object model which encapsulates the following functionalities with respect to identity policies: inheritance, override, polymorphism, and security boundaries.

Inheritance of policies provides for parent policies and child policies being of the same schema and flexibility. For example a child policy can inherit the parent policy functionality and "extend" it, e.g., by adding a new element to effectively extend the parent policy. According to embodiments, there may be no limits on the number extension levels in child policies.

Overrides provide for the child policy to override "allowed" aspects of the parent policy. In embodiments, any portion of a policy may be "overridden" in a child policy. When an element is called out in the child policy and also in the parent policy, this implies that the child policy is overriding that element of the parent policy.

In polymorphism aspects of the IEF for identity policies, orchestration steps refer to a claims provider's technical profile, which in turn refer to metadata. The trustframework engine may be configured to account for the referential nature of such policy elements when enforcing the policy, inclusive of override behavior. Accordingly, these references are polymorphic.

Regarding security boundaries, because a parent policy or its child policy could span across tenants, references to cryptographic key materials may be kept within the boundary of the organization that owns them.

Child policies may be modified/created by, or have parameters specified by, application service providers including application developers therefor. That is, according to the embodiments and techniques for the IEF described herein, another entity, e.g., associated with the identity policy host, associated with an identity operator, etc., may create or modify child policies for utilization by applications.

By using trustframeworks to conceptualize and capture the requirements of a "community of interest" and then define these requirements in a policy document, policy authors (e.g., identity operators) can build identity workloads of varying complexity, in a manner that aligns with the needs or requirements of the drivers of the community and not the technology. Having a language for articulating the identity needs for workloads fosters collaboration and partnerships between policy authors, identity experts, and business stakeholders.

A trustframework engine is the service that executes the trustframework policy. The trustframework engine may comprise loosely coupled state machine handlers that can invoke specific concrete implementations of identity semantics, and a state machine that instantiates and executes the identity semantics in the context of the user journey and the policy being executed. Each authorization request made to the IEF may be processed in the context of a trustframework policy that defines the user journey. In embodiments, there may be no identity logic outside of what is declared in the policy and implemented by the specific claims providers. This is analogous to the trustframework policy being the identity application and the trustframework engine being an operating system that runs that application, except in this case, the instruction set allowed by the operating system comprises the constructs exposed by the trustframework schema.

As referred to herein, an "application" and a "service" with which a user seeks authentication may be collectively referred to as an "application" for brevity. An "application" or a "service" may be a website, a web application, a cloud-based utility, a stand-alone application that executes on a user device, and/or the like, that utilizes user authentication as described herein, e.g., according to the described IEF. It should also be noted that while some embodiments herein are described in a business-to-consumer context for various types of user journeys and authentication, such embodiments are described in this context for purposes of discussion and illustration only. Any described contexts are not to be considered limiting of any embodiments or equivalents herein. For example, an embodiment described in a business-to-consumer context may also be applicable to business-to-business contexts and/or business-to-employee contexts.

Accordingly, systems, apparatuses, and devices may be configured and enabled in various ways for providing composable user journeys using the IEF. For example, FIG. 1 is a block diagram of a system 100, according to embodiments. System 100 is a networked computing system for providing composable user journeys using the described IEF, according to an embodiment. As shown in FIG. 1, system 100 includes a user device 102, a verification provider(s) 114, an application service provider 116, an identity operator system 118, and a trustframework host system 104, which may communicate with each other over a network 110. It should be noted that the number of user devices, verification providers, application service providers, and/or identity operators of FIG. 1 is exemplary in nature, and greater numbers of each may be present in various embodiments. Additionally, any combination of components illustrated may comprise a system for providing composable user journeys using the described IEF, according to embodiments.

User device 102, verification provider 114, application service provider 116, identity operator system 118, and trustframework host system 104 are configured to be communicatively coupled via network 110. Network 110 may comprise any type of connection(s) that connects computing devices and servers such as, but not limited to, the Internet, wired or wireless networks and portions thereof, point-to-point connections, local area networks, enterprise networks, and/or the like.

Trustframework host system 104 may comprise one or more server computers, which may include one or more distributed or "cloud-based" servers, one or more non-cloud-based servers, and/or one or more local servers (e.g., an application service provider's servers), in various embodiments. Trustframework host system 104 is configured to provide composable user journeys according to the IEF for a user of user device 102 that attempts to access an application of application service provider 116, e.g., via a user interface (UI) 112 over network 110. As illustrated, trustframework host system 104 includes policies 106 and an identity experience engine ("engine") 108. Trustframework host system 104 may be configured to provide composable user journeys according to the IEF via engine 108, in embodiments. For example, engine 108, described in further detail below, may be configured to execute a user authentication process that is defined by an identity policy of policies 106 that is called by an application to which a user seeks authentication and access.

User device 102 may be any type of computing device or computing system, including a terminal, a personal computer, a laptop computer, a tablet device, a smart phone, etc., that may be used to provide UI 112 to a user for authentication and access to services/applications hosted by application service provider 116. For instance, as shown in FIG. 1, user device 102 includes UI 112 which may be a web browser, portal, plug-in, an interface of a service/application stored on or otherwise accessed by user device 102, or other UI by which the user of user device 102 interacts with applications/services hosted (or provided) by application provider 116. In some embodiments, user device 102 may be configured to receive UI 112 from application service provider 116 and/or trustframework host system 104 to enable a user to provide authentication information for an application or service. In embodiments, user device 102 and/or UI 112 may be configured to receive and display a policy UI, described in further detail below, from trustframework host system 104 to enable a user to provide log-in credentials or other identity information required to be authenticated for access an application. UI 112 may operate independently of trustframework host system 104 in some embodiments.

Application service provider 116 may be any type of computing device and may comprise one or more server computers, which may include one or more distributed or "cloud-based" servers. Application service provider 116 may be configured to host and/or provide one or more services and/or applications, including UIs thereof, which may be utilized by users of user device 102. In embodiments, application service provider 116 and/or services/applications thereof, may be configured to issue calls indicating or specifying an identity policy of a plurality of identity policies for dynamic deployment for the application. For example, an identity policy may be explicitly/expressly provided in the call (i.e., indicated and specified). In another example, if no policy is explicitly specified in the call, this indicates, with respect to the call, that a default policy may be used. The call for specified identity policy may cause trustframework host system 104 to execute a user authentication process defined by the called (including indicated) identity policy to provide a policy UI(s) to the application for user authentication. In embodiments, application service provider 116 may be a tenant of trustframework host system 104 (i.e., trustframework host system 104 also hosts at least one application of application service provider 116).

Identity operator system 118 may be any type of computing device and may comprise one or more server computers, which may include one or more distributed or "cloud-based" servers. As noted above, identity operators/authors purpose-build identity solutions that may be used by application service providers 116 to authenticate users for application/service accesses, sign-ups, etc. Identity operators/authors may develop such solutions as policies 120 using identity operator system 118. Policies 120 may be provided to trustframework host system 104 and stored as one of a plurality of policies 106.

As noted above, engine 108 is configured to execute a user authentication process that is defined by an identity policy, e.g., of policies 106, that is called by an application of application service provider 116 to which a user seeks authentication and access from user device 102. Engine 108 may include a plurality of components for performing the techniques described herein for composable user journeys according to the IEF, including dynamic policy calls and UI provisioning, as well as identity authentication therewith.

For instance, engine 108 may include a communicator, a policy selector, a policy executor, a verification provider(s) and handler (s), a UI manager, and a policy portal. Further details regarding engine 108 and subsequent embodiments are provided below.

Policies 106 may be provided to trustframework host system 104 by policy operators/authors of identity operator system(s) 118, or may be provided within an organization that provides the described IEF services via trustframework host system 104. A policy may define multiple user journeys, where each user journey is a sequence of orchestration steps, as described herein. A policy may also define the particular user journey it enforces by choosing one of the possible user journeys defined. Further details regarding policies 106 and subsequent embodiments are provided below.

Verification provider 114 may be any type of computing device or computing system, and may comprise one or more server computers, which may include one or more distributed or "cloud-based" servers. As noted above, attribute providers or claims providers may provide specific identity checks for users that are being authenticated. In embodiments, verification provider 114 is configured to provide such specific identity checks for user authentication via the trustframework policy of the IEF. Verification provider 114 may provide any types of identity checks in addition to, or in lieu of, claims providers included in trustframework host system 104 as described above (e.g., an email address validation provider, an identity provider for local accounts, an attribute provider, a multi-factor authentication (MFA) provider, a self-asserted provider, a directory provider such as Azure® Active Directory® from Microsoft Corporation of Redmond, WA, etc.).

As described herein, verification providers such as attribute providers, identity providers, directory providers, multi-factor authentication (MFA) providers, self-asserted attribute providers, etc., may all be modeled as claims providers, and accordingly, when claims providers are described, any number of these other providers are also considered in addition to, or in lieu of, claims providers for such embodiments.

While single instances of user device 102, verification provider 114, application service provider 116, and identity operator system 118 are illustrated for brevity and clarity, it is contemplated herein that any number of these components may be present in various embodiments of system 100 of FIG. 1. For example, application service provider 116 may provide one or more different applications via the described IEF, and different and/or unrelated application service providers 116 may each provide their own application(s). Likewise, one or more identity operators that may be separate and/or unrelated to each other, as well as one or more verification providers that may be separate and/or unrelated to each other, may also be included for utilization via the IEF.

Accordingly, user device 102, verification provider 114, application service provider 116, and identity operator system 118, and/or trustframework host system 104 are configured to utilize one or more aspects of the described IEF to provide composable user journeys, as described herein. User device 102, verification provider 114, application service provider 116, and identity operator system 118, and/or trustframework host system 104, and any subcomponents thereof, may be configured and enabled in various ways to perform these functions.

A. Example Embodiments for Identity Experience Framework Hosts

Figure 2:
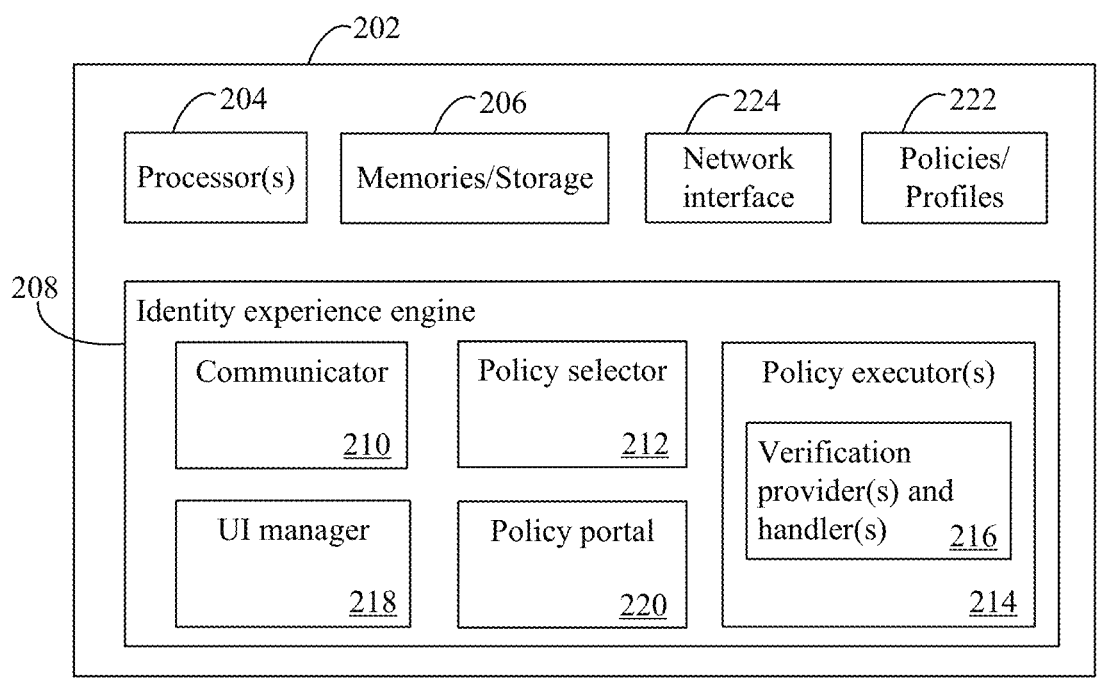
FIG. 2 shows a block diagram of a computing system for composable user journeys using an identity experience framework, according to an example embodiment.
Figure 3:
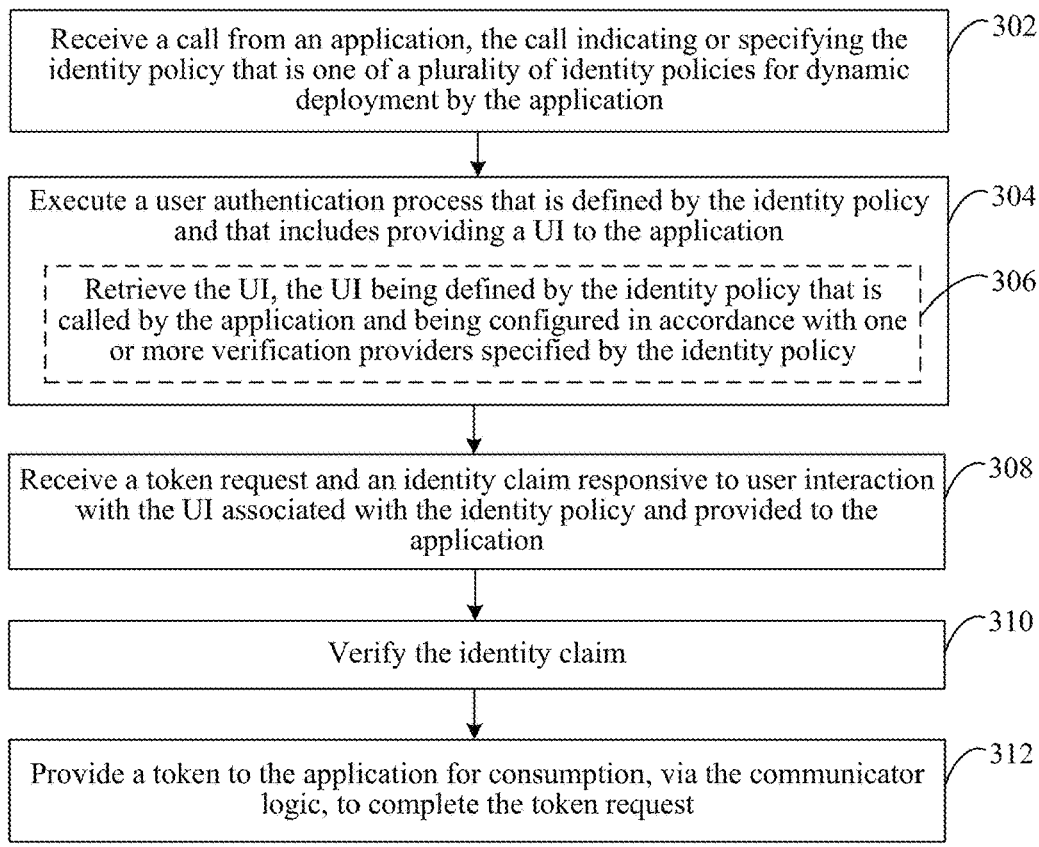
FIG. 3 shows a flowchart for composable user journeys using an identity experience framework, according to an example embodiment.

As noted above, systems, apparatuses, and devices may be configured and enabled in various ways for composable user journeys based on the described IEF. For instance, a trustframework host system (also referred to as an identity policy host) such as trustframework host system 104 may be configured for composable user journeys based on the described IEF. FIGS. 2 and 3 will now be described in this context.

For example, FIG. 2 is a block diagram of a system 200, according to an embodiment. System 200 may be a computing system for composable user journeys, according to embodiments. As shown in FIG. 2, system 200 includes an identity policy host 202 which may be referred to as a computing device/system. System 200 may be a further embodiment of system 100 of FIG. 1, and identity policy host 202 may be a further embodiment of trustframework host system 104 of FIG. 1.

Figure 14:
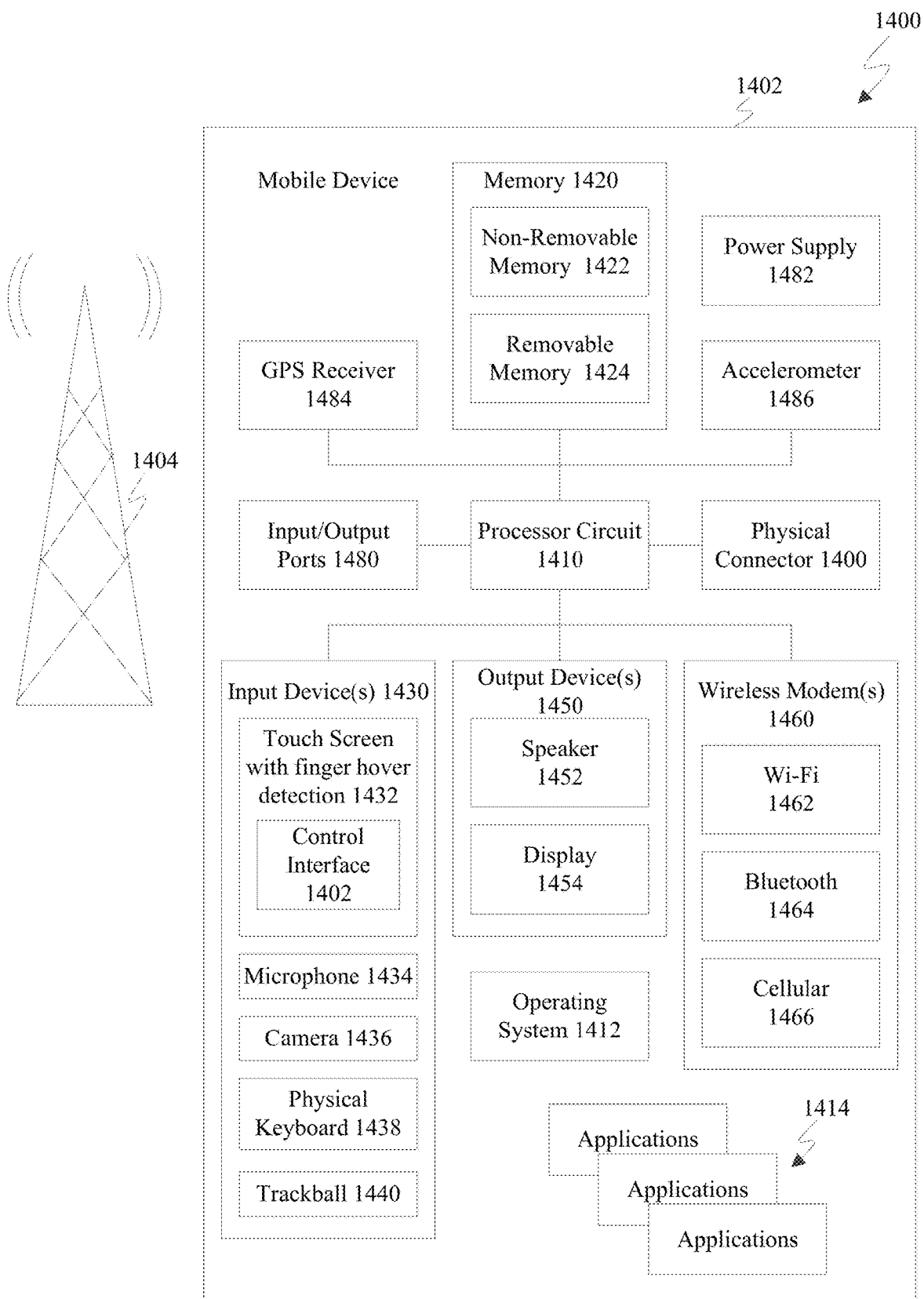
FIG. 14 shows a block diagram of an example mobile device that may be used to implement various example embodiments.
Figure 15:
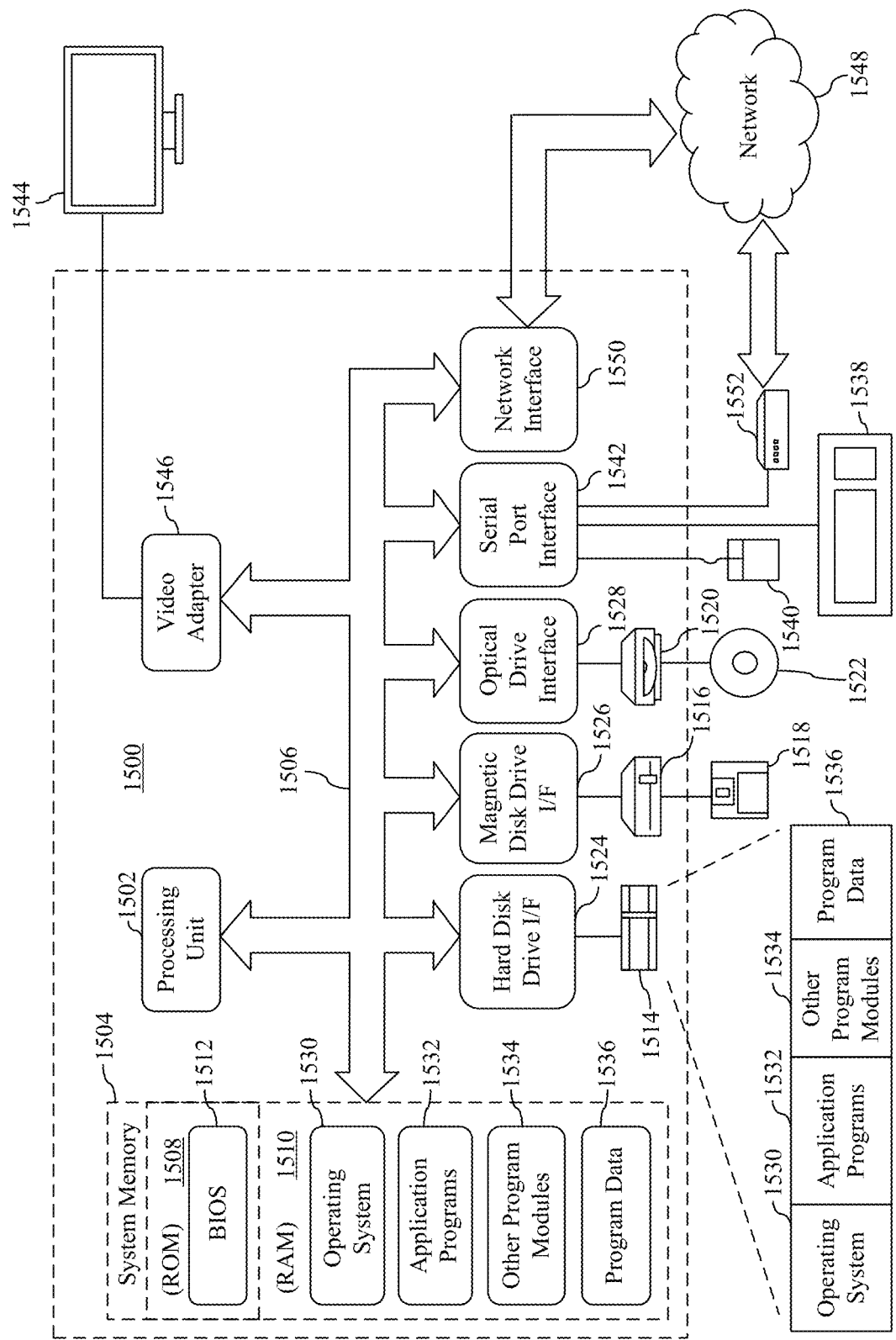
FIG. 15 shows a block diagram of an example processor-based computer system that may be used to implement various example embodiments.

In FIG. 2, identity policy host 202 may be any type of server computer or computing device, as mentioned elsewhere herein, or as otherwise known. As shown in FIG. 2, identity policy host 202 includes one or more of a processor ("processor") 204, one or more of a memory and/or other physical storage device ("memory") 206, policies and profiles 222, a network interface 224, and an identity experience engine ("engine") 208 which may be an embodiment of engine 108 of FIG. 1. System 200 may also include additional components (not shown for brevity and illustrative clarity) including, but not limited to, components and subcomponents of other systems herein, as well as those described below with respect to FIGS. 14 and 15, e.g., an operating system.

Processor 204 and memory 206 may respectively be any type of processor circuit or memory that is described herein, and/or as would be understood by a person of skill in the relevant art(s) having the benefit of this disclosure. Processor 204 and memory 206 may each respectively comprise one or more processors or memories, different types of processors or memories, remote processors or memories, and/or distributed processors or memories. Processor 204 comprises circuitry that is configured to execute computer program instructions such as but not limited to embodiments of engine 208 and/or policies of profiles and policies 222, e.g., as computer program instructions for application session monitoring and control such as program logic for composable user journeys according to the described IEF, etc., as described herein. Memory 206 is configured to store such computer program instructions, as well as to store other information and data described in this disclosure including, without limitation, policies, profiles, content definitions, etc.

Figure 6:
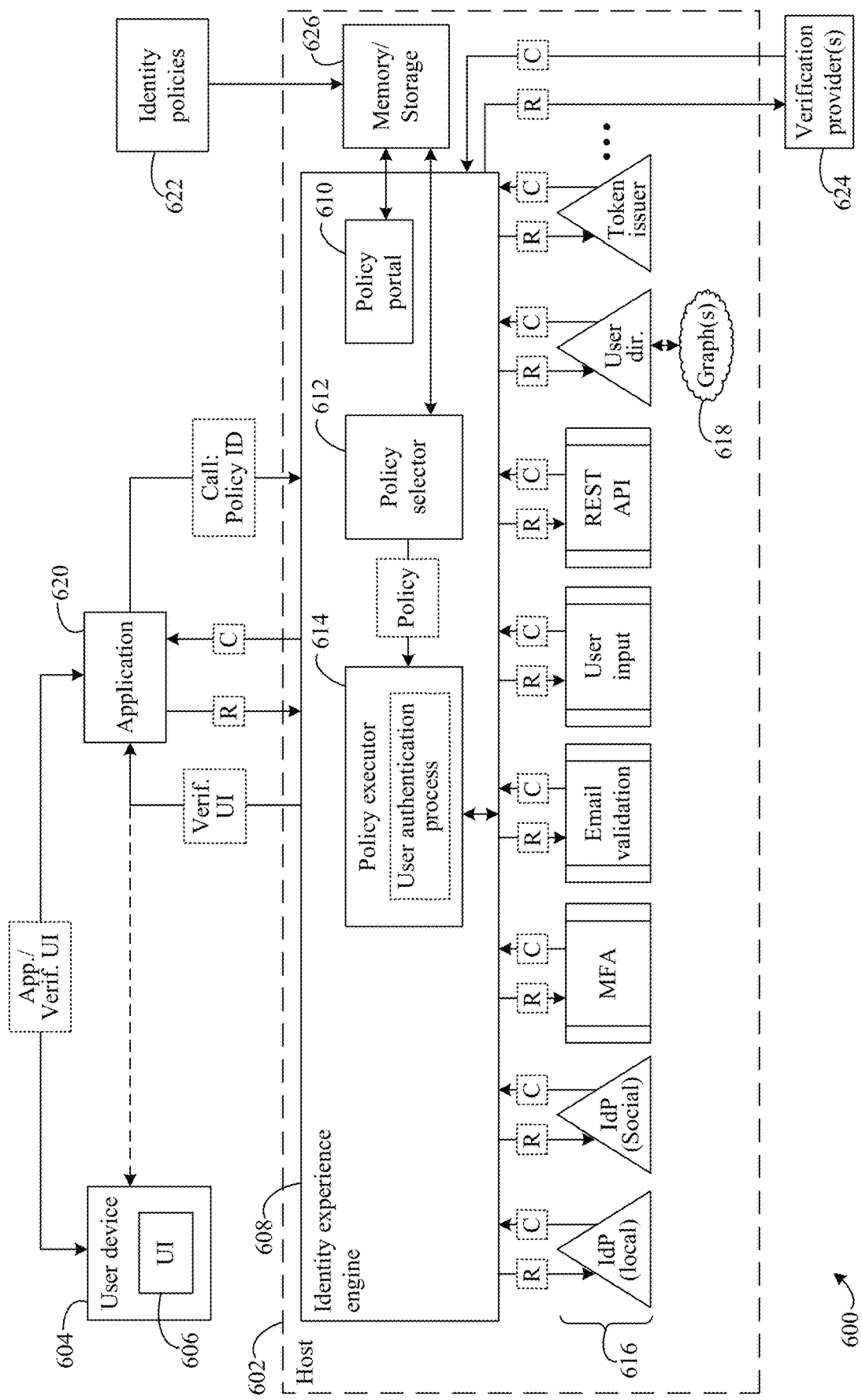
FIG. 6 shows a block diagram of a computing system for composable user journeys using an identity experience framework, according to an example embodiment.
Figure 10:
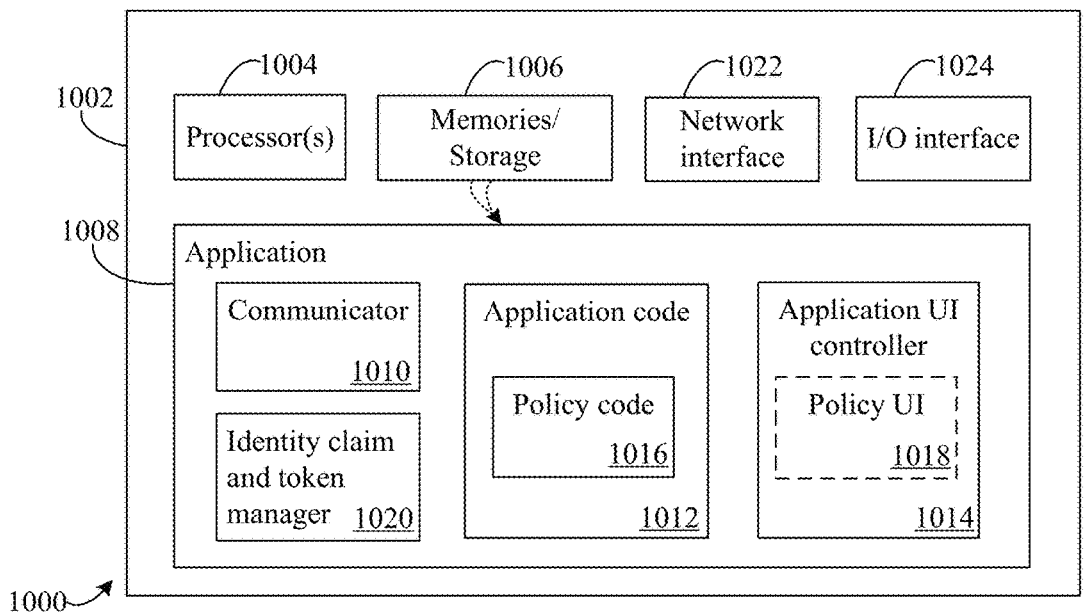
FIG. 10 shows a block diagram of a computing system for composable user journeys using an identity experience framework, according to an example embodiment.

Network interface 224 may be any type of wired and/or wireless network adapter, modem, etc., configured to enable identity policy host 202 to communicate with other devices over a network, e.g., such as communications between identity policy host 202 and other devices utilized in the IEF (e.g., user device 102, verification provider 114, application service provider 116, and/or identity operator 118) over a network such as network 110 as described above with respect to FIG. 1, as well as system 600 of FIG. 6 and/or system 1000 of FIG. 10, as described below.

Identity experience engine ("engine") 208 as illustrated, includes a plurality of components for performing the techniques described herein for composable user journeys according to the IEF. As shown, engine 208 includes a communicator 210, a policy selector 212, a policy executor 214, a verification provider and handler 216, a UI manager 218, and a policy portal 220. While shown separately for illustrative clarity, in embodiments, one or more of communicator 210, policy selector 212, policy executor 214, verification provider and handler 216, UI manager 218, and/or policy portal 220 may be included together with each other and/or as a part of other components of system 200.

Referring also now to FIG. 3, a flowchart 300 for composable user journeys according to the IEF is shown, according to an example embodiment. In embodiments, the functions of flowchart 300 for composable user journeys for application authentication may be performed by a trust-framework host system (i.e., an identity policy host) using information and services from user devices, application service providers, identity operators, and verification providers, as described herein. For purposes of illustration, flowchart 300 of FIG. 3 is described with respect to system 200 of FIG. 2 and its subcomponents including engine 208 and policies and profiles 222, as well as system 100 of FIG. 1. That is, system 200 of FIG. 2 may perform various functions and operations in accordance with flowchart 300 for composable user journeys. Further structural and operational examples will be apparent to persons skilled in the relevant art(s) based on the following description. Flowchart 300 is described as follows.

Flowchart 300 begins at step 302. In step 302, a call is received from the application, the call specifying the identity policy that is one of a plurality of identity policies for dynamic deployment on behalf of the application. For instance, communicator 210 is configured to receive and/or transmit electronic communications for engine 208 of identity policy host 202 for composable user journeys, as described herein. For instance, communicator 210 is configured to receive calls from applications for identity policies required thereby, e.g., via network interface 224. As shown in FIG. 1, an application or service from application service provider 116 may be interacted with by a user of user device 102 via UI 112. The application may include specific policy code, described in further detail below, that specifies and makes a call for one of several identity policies at trustframework host system 104 for dynamic deployment on behalf of the application for authentication of the user based on the call. Similarly, identity policy host 202 is configured to receive such a call from an application for an identity policy via communicator 210.

In step 304 a user authentication process that is defined by the identity policy and that includes providing a UI to the application is executed. For instance, policy executor 214 is configured to execute user authentication processes defined by identity policies. The call from the application specifying the identity policy in step 302 may be passed to policy selector 212 which is configured to select and retrieve the specified identity policy from policies and profiles 222. Alternatively, communicator 210 may be configured to pass an identifier for the specified identity policy to policy selector 212. The retrieved identity policy may be used by policy executor 214 to execute the user authentication process.

In embodiments, executing the user authentication process includes providing a UI to the application. The UI may be a UI associated with the identity policy that the user will interact with for authentication in the application. The UI may be defined in the identity policy through content definitions and may be customized to conform to authentication with specific types of verification providers. The UI may be provided to the application for display to the user via communicator 210, in embodiments.

Step 304 may include an optional or additional step, shown as step 306. In step 306, the UI, defined by the identity policy that is called by the application, and configured in accordance with one or more verification providers specified by the identity policy, is retrieved. In embodiments, the UI may be retrieved in step 306 prior to the providing of the UI in step 304. According to embodiments, UI manager 218 may be configured to generate the UI according to the identity policy and the specified types of verification providers therein. In embodiments, retrieval of the UI may include retrieving the UI itself, retrieving UI code, retrieving a universal resource identifier (URI) of the UI, and/or the like.

In some embodiments, the UI may be specified in the identity policy and UI manager 218 may be configured to override or alter one or more aspects of the UI before the UI is provided to the application. For instance, the specified identity policy may be leveraged from a base or parent identity policy in which one or more aspects of the parent identity policy are altered based on content definitions in the specified identity policy (i.e., a child policy). In one example, Hypertext Markup Language (HTML) may be used to define the look and feel of the UI in a parent identity policy via cascading style sheets (CSS), and the specified identity policy requires leveraging the parent identity policy while modifying the look and feel by overriding the LoadURI for the HTML. In other words, content definitions may define the HTML and page template (e.g., "XXX.api.xml"), e.g., extensible markup language (XML) file, that are used for a given UI step, and UI generator 218 may be configured to perform modifications with respect to the base UI according to the content definitions in the identity policy. In embodiments, an application service provider, including application developers thereof, and/or identity operators on behalf of application service providers, may author, extend, and/or modify content definitions and/or associated documents (or portions thereof), examples of which are provided immediately above.

It should be noted that while example scenarios involving HTML are provided for illustration and discussion, other formats for UIs are also contemplated herein for different embodiments.

In step 308, a token request and an identity claim are received responsive to user interaction with the UI associated with the identity policy and provided for the application. Again, communicator 210 may be configured to receive communications from the application, such as the token request and the identity claim. When a user interacts with the UI provided in step 304 to enter identity information as prompted by the UI for the specified authentication, the application and/or the UI uses such information to generate the token request and the identity claim. The token request and the identity claim are then provided to engine 208 to continue the user journey.

In step 310, the identity claim is verified. For example, the identity claim received in step 308 may be provided to verification provider and handler 216 which is configured to, via one or more handlers, read or write to external verification providers, such as verification provider 114 of FIG. 1, to verify the identity claim against the verification providers (attribute providers, claims providers, and/or the like, as described herein). Additionally or alternatively, verification provider and handler 216 may include one or more verification providers such as the "out of the box" providers described above (e.g., an email address validation provider, an identity provider for local accounts, an attribute provider, a multi-factor authentication (MFA) provider, a self-asserted provider, a directory provider such as Azure® Active Directory® from Microsoft Corporation of Redmond, WA, etc.), that may be used for verifying identity claims. The attribute and/or claims providers used for verification of the identity claim may be specified according to the identity policy used. In multi-factor authentication processes, verification of identity claim information may be performed multiple times for each type of authentication required by the identity policy.

In some embodiments, policy executor 214 may receive the identity claim which may cause policy executor 214 to invoke verification provider and handler 216 to verify the identity claim as described above. For example, a handler of verification provider and handler 216 may be configured to perform input and/or output transformations as described herein. The handler of verification provider and handler 216 may be configured to In step 312, a token is provided to the application for consumption, via the communicator logic, to complete the token request. For instance, when the identity claim is verified in step 310, policy executor 214 may receive an indication of the verification and a token corresponding to the token request of step 308 may be generated through the user authentication process according to the identity policy. The generated token is then provided to the application for consumption, e.g., via communicator 210, to complete the token request and allow the user access to one or more portions of the application.

Figure 4:
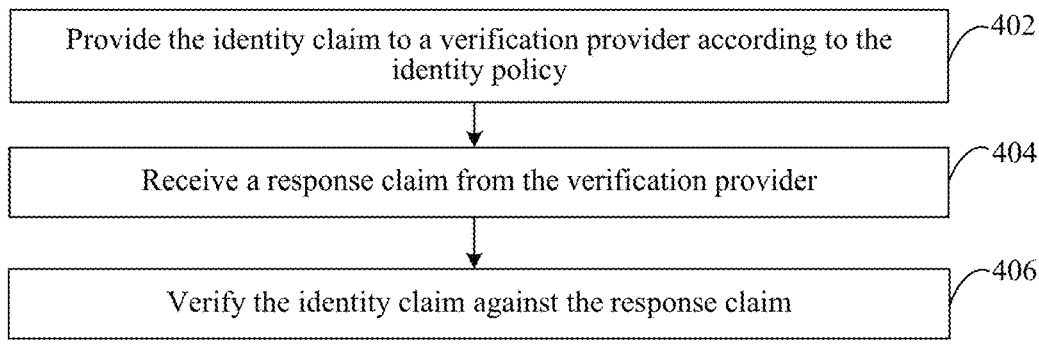
FIG. 4 shows a flowchart for composable user journeys using an identity experience framework, according to an example embodiment.

Referring now to FIG. 4, a flowchart 400 for composable user journeys according to the IEF is shown, according to an example embodiment. In embodiments, the functions of flowchart 400 for composable user journeys for application authentication may be performed by a trustframework host system (i.e., an identity policy host) using information and services from user devices, application service providers, identity operators, and verification providers, as described herein. For purposes of illustration, flowchart 400 of FIG. 4 is described with respect to system 200 of FIG. 2 and its subcomponents including engine 208 and policies and profiles 222, as well as system 100 of FIG. 1. That is, system 200 of FIG. 2 may perform various functions and operations in accordance with flowchart 400 for composable user journeys. Flowchart 400 may be an embodiment of flowchart 300 of FIG. 3, e.g., of step 310. Further structural and operational examples will be apparent to persons skilled in the relevant art(s) based on the following description. Flowchart 400 is described as follows.

Flowchart 400 begins at step 402. In step 402, the identity claim is provided to a verification provider according to the identity policy. For instance, as described above in step 308 of flowchart 300 in FIG. 3, an identity claim may be received by communicator 210 of FIG. 2 from UI 112, executing as part of an application, of user device 102, as shown in FIG. 1. The identity claim may be provided to policy executor 214 that is executing a user authentication process defined by the identity policy called from the application. Policy executor 214 may be configured to determine a verification provider(s) specified by the identity policy. In embodiments, the determined verification provider(s) may be executing on computing system 202 or within the same domain as computing system 202, and/or may be external to computing system 202 as shown in FIG. 1 by verification provider 114. According to embodiments, the verification provider(s) may be one or more of an identity provider, an attribute provider, a directory provider, a multi-factor authentication (MFA) provider, an email validation provider, self-asserted attribute provider, and/or the like. In embodiments, a verification provider may be a new verification provider of any type that follows an existing protocol(s) to allow it to be invoked. Policy executor 214 may be configured to provide the identity claim to external verification provider(s) via communicator 210.

In step 404, a response claim is received from the verification provider. For example, a response claim from the verification provider(s) described above in step 402 may be received by communicator 210 and/or policy executor 214. The verification provider(s) are configured to consume the identity claim as an input, and provide a response claim(s) as an output. Response claims may include indicia of authentication for the identity claim, metadata and/or personal data related to the user or to the identity claim, and/or any other information required by the identity policy. Non-limiting examples of verification providers and response claims are described next.

For instance, email address validation providers may validate an existing email address using one-time code. This proves possession of the email address and may be used in registration and account recovery flows and user journeys. Verifying the possession of the email address may result in indicia thereof and/or information related to the user being provided to policy executor 214 of FIG. 2 as a response claim.

An IdP for local accounts, e.g., accounts within the domain of computing system 200 or identity policy host 202 of FIG. 2, such as accounts for tenants of hosted services from Microsoft Corporation of Redmond, WA, may provide a login/password-based authentication provider. In embodiments, for each tenant, the login string may be supported as any email address, while in other embodiments the login string may be a username, a phone number, an ID number, and/or the like. Verifying the login and password of the account may result in indicia thereof and/or information related to the user/account being provided to policy executor 214 of FIG. 2 as a response claim.

A multi-factor authentication provider validates possession of a phone number, e.g., via text message or a voice call. Validation may be performed for an existing phone number or collection of a new phone number to be validated as part of provisioning flows and user journey may be performed. Verifying the phone number may result in indicia thereof and/or information related to the phone number being provided to policy executor 214 of FIG. 2 as a response claim.

A self-asserted provider allows the policy author to declare what information to collect from the user and makes this information available as self-asserted claims. Self-asserted providers support various data types as well as constraints on the allowed values for the information. Verifying the self-asserted claims for the account may result in indicia thereof and/or information related to the user/account being provided to policy executor 214 of FIG. 2 as a response claim.

A user directory provider, e.g., Azure® Active Directory® from Microsoft Corporation of Redmond, WA, allows user objects to be stored. User director providers also allow user CRUD (create, read, update, delete) code along with managing user attributes. The attributes range from simple key value pairs to security information such as alternate security identifiers for referencing social identity providers and strong authentication properties such as verified email addresses and phone numbers to credentials such as passwords. Verifying the identity claim to stored director information/attributes for the account may result in indicia thereof and/or information related to the user/account (including attributes) being provided to policy executor 214 of FIG. 2 as a response claim.

It should also be noted that while a few examples of verification providers are described above for illustration of the disclosed embodiments, other types of verification providers are also similarly contemplated herein, there specific details, claims, and response claims being omitted for brevity. Briefly, examples of existing verification providers and services with which the described IEF is compatible include, without limitation, social identity providers such as Facebook®, Amazon®, LinkedIn®, etc., OIDC identity providers, SAML identity providers, Azure® application insights from Microsoft Corporation of Redmond, WA, that enable collecting insights from within the identity experience/user journey directly to the relying party's application insights, representational state transfer (REST) API providers that enable connecting to any existing REST endpoint, additional Azure® functions such as Azure® logic applications that enable code extensibility within the user journey, and/or the like.

In step 406, the identity claim is verified against the response claim. For example, the response claim received in step 404 may be provided to verification provider and handler 216 which is configured verify that any indicia of verification in the response claim and/or any attributes, metadata, and/or other information received correspond to the identity claim. In multi-factor authentication processes, verification of identity claim information may be performed multiple times for each type of authentication required by the identity policy.

Figure 5:
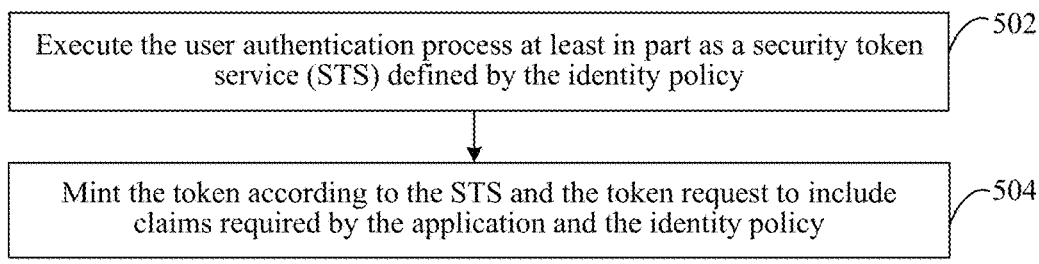
FIG. 5 shows a flowchart for composable user journeys using an identity experience framework, according to an example embodiment.

Referring now to FIG. 5, a flowchart 500 for composable user journeys according to the IEF is shown, according to an example embodiment. In embodiments, the functions of flowchart 500 for composable user journeys for application authentication may be performed by a trustframework host system (i.e., an identity policy host) using information and services from user devices, application service providers, identity operators, and verification providers, as described herein. For purposes of illustration, flowchart 500 of FIG. 5 is described with respect to system 200 of FIG. 2 and its subcomponents including engine 208 and policies and profiles 222, as well as system 100 of FIG. 1. That is, system 200 of FIG. 2 may perform various functions and operations in accordance with flowchart 500 for composable user journeys. Flowchart 500 may be an embodiment of flowchart 300 of FIG. 3, e.g., of step 312. Further structural and operational examples will be apparent to persons skilled in the relevant art(s) based on the following description. Flowchart 500 is described as follows.

Flowchart 500 begins at step 502. In step 502, the user authentication process is executed at least in part as a security token service (STS) defined by the identity policy. For instance, as noted above, policy executor 214 is configured to execute a user authentication process that is defined by the identity policy. In embodiments, policy executor 214 is configured to execute at least a portion the user authentication process as, or as emulating, an STS. STS, or STS-like functionality may be defined by the identity policy and allow policy executor 214 to mint tokens based on token requests received from applications, e.g., as in step 308 of flowchart 300 in FIG. 3.

In step 504, the token is minted according to the STS and the token request. For example, as noted above, policy executor 214 may be configured to mint tokens based on token requests and the STS functionality defined by the identity policy. That is, according to embodiments, policy executor 214, executing the user authentication process defined by the identity policy, acts as an STS and is configured to mint a token to provide to the application and complete the token request as in step 312 of flowchart 300 in FIG. 3.

Referring now to FIG. 6, a block diagram of a system 600 is shown, according to an example embodiment. System 600 may be a computing system for composable user journeys according to the described IEF, in embodiments. As shown in FIG. 6, system 600 includes an identity policy host 602 which may be referred to as a computing device/system. System 600 may be an embodiment of system 200 of FIG. 1, and identity policy host 602 may be an embodiment of identity policy host 202 of system 200 in FIG. 2.

In FIG. 6, identity policy host 602 may be any type of server computer or computing device, as mentioned elsewhere herein, or as otherwise known. While not shown for brevity and illustrative clarity, identity policy host 602 may include one or more processor(s) and/or network interfaces as described herein. As shown, identity policy host 602 includes one or more of a memory and/or other physical storage device, memory/storage 626 (or "memory" 626). Identity policy host 602 includes an identity experience engine ("engine") 608 which may be an embodiment of engine 208 of system 200 in FIG. 2. System 600 may also include one or more user devices such as user device 604 having a UI 606 (which may respectively be embodiments of user device 102 and UI 112 of FIG. 1), as well as additional components (not shown for brevity and illustrative clarity) including, but not limited to, components and subcomponents of other systems herein, as well as those described below with respect to FIGS. 14 and 15, e.g., an operating system.

Memory 626 is configured to store such computer program instructions, as well as to store other information and data described in this disclosure including, without limitation, policies, profiles, content definitions, etc. For example, memory 626 may be configured to store policies and profiles such as identity policies 622 and associated profiles and content definitions from verification providers, as described herein.

Engine 608, as exemplarily illustrated, includes a plurality of additional components for performing the techniques described herein for composable user journeys according to the described IEF. As shown, engine 608 also includes, a policy selector 612, a policy executor 614, and a policy portal 610, which may respectively be embodiments of policy selector 212, a policy executor 214, and a policy portal 210 of system 200 in FIG. 2. While not shown for brevity and illustrative clarity, in embodiments, engine 608 may also include one or more of a communicator, a verification provider, and/or a verification provider and handler, as described with respect to system 200 of FIG. 2.

System 600 and/or identity policy host 602 may be configured to perform one or more steps of flowchart 300 of FIG. 3, flowchart 400 of FIG. 4, and/or flowchart 500 of FIG. 5, according to embodiments. In embodiments, an application 620 from an application service provider may be accessed by user device 604 via UI 606. For instance, a user of user device 604 may utilize UI 606 (e.g., a web browser) to access the home page via the URI associated with www.fifa.com. The UI implemented by this application provider may be provided to the web browser for interaction by the user. If the user desires to login to their account from the home page, the user may interact with selectable options of the UI to sign in to their account, or to sign up for an account. Such an interaction may cause policy code, described below, in the application or the UI to activate and generate a call for an identity policy to identity policy host

602. The call may include a policy identifier (ID) required by the application service provider for www.fifa.com.

When the call is received by identity policy host 602, policy selector 612 may be configured to select and retrieve the specified identity policy set forth in the call from policies stored in memory 626 based on the policy ID. The retrieved identity policy may be provided to and used by policy executor 614 to execute the user authentication process. For example, the specified identity policy may define a verification UI with which the user is required to interact at user device 604 via UI 606 for the sign up or sign in actions. This verification UI may be provided to application 620 and then to user device 604, or may be provided directly to user device 604 in embodiments. The verification UI may provide the user options to login/sign in using social media accounts or using a username/email and a password. For sign up, the verification UI may provide the user options to enter information required by the application service provider to create an account (e.g., an email address for email verification, and/or user information such as a password, a name, a screen name, gender, country of residence, date of birth, etc.). Additionally, the user may be required to agree to terms of service to sign up and create an account.

The user may then further interact with the verification UI to indicate the sign in/sign up information has been entered via the verification UI causing a token request and an identity claim to be provided to identity policy host 602, e.g., via application 620. As shown in FIG. 6, claims provided during user journeys are denoted as request "R" for input claims and as consume "C" for output claims.

For instance, application 620 is shown as providing the token request and the identity claim ("R") to host identity policy host 602. The provided identity claim is used by policy executor 614 for verification thereof, e.g., as described in flowchart 400 of FIG. 4. For example, policy executor 614 may provide the identity claim to one or more of verification providers 616. Verification providers 616 may include local account IdPs, social network IdPs, MFAs, email validators, user input validators, REST APIs, token issuers, user directories (which may include user graphs 618), and/or the like as described herein. The identity claim is provided as verification provider input ("R"), and an output response claim ("C") is returned to policy executor 614. In embodiments, additional identity information and/or attributes may be provided in response claims from verification providers. Policy executor 614 is then configured to verify the identity claim against the response claim.

In some embodiments, one or more of verification providers may be external to the domain or system of identity policy host 602, and external, third-party verification providers 624 (which may be an embodiment of verification provider(s) 114 in FIG. 1) may be also be utilized depending on how the identity policy is defined.

Once the original identity claim is validated, a token may be minted by policy executor 614, e.g., as described in flowchart 500 of FIG. 5. For example, the authentication process executed by policy executor 614 may be, or emulate, a security token service (STS) configured to mint tokens. The response claim received from the verification provider(s) includes the claims required by the application and the identity policy for authentication of the user, and these claims are included in minting the token which is then provided from identity policy host 602 back to application 620 ("C") to complete the token request and allow the user to access one or more portions of application 620.

Policy portal 610 may be configured to provide access to identity policy host 602 for modifying, extending, managing, and/or creating identity policies by identity operators, verification providers, and/or application service providers, as described herein.

Figure 7:
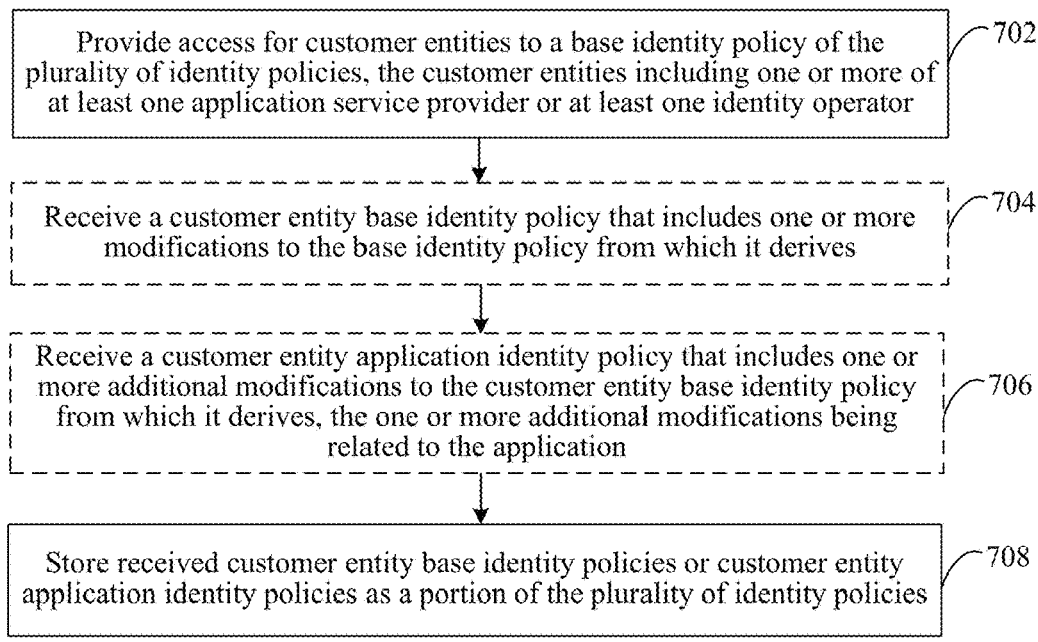
FIG. 7 shows a flowchart for composable user journeys using an identity experience framework, according to an example embodiment.

Policy portal 610 will now be described in further detail with respect to FIGS. 7, 8, and 9. In FIG. 7, a flowchart 700 for composable user journeys according to the IEF is shown, according to an example embodiment. In embodiments, the functions of flowchart 700 for composable user journeys for application authentication may be performed by a trustframework host system (i.e., an identity policy host) using information and services from user devices, application service providers, identity operators, and verification providers, as described herein. For purposes of illustration, flowchart 700 of FIG. 7 is described with respect to system 600 of FIG. 6 and its subcomponents including policy portal 610, as well as system 100 of FIG. 1. That is, system 600 of FIG. 6 may perform various functions and operations in accordance with flowchart 700 for composable user journeys. Further structural and operational examples will be apparent to persons skilled in the relevant art(s) based on the following description.

Figure 8:
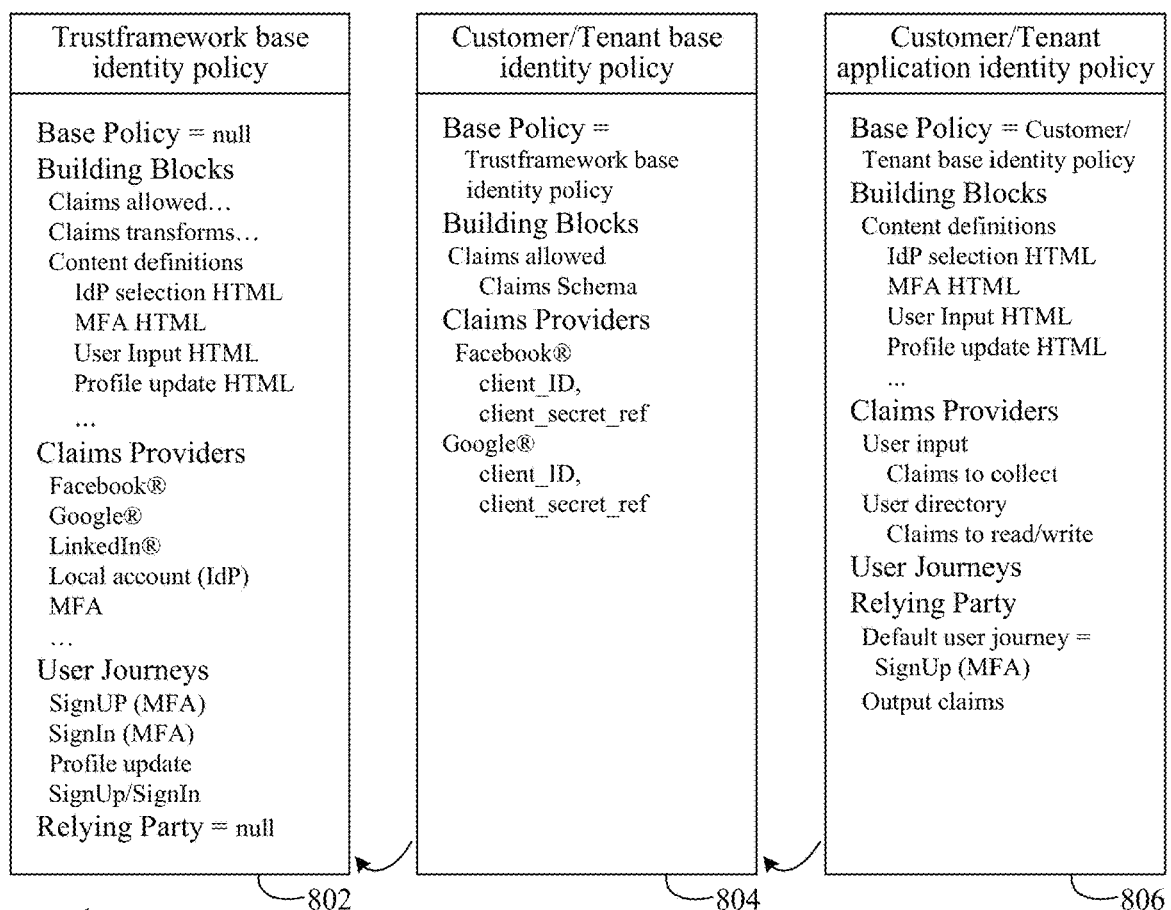
FIG. 8 shows a diagram of identity policies for composable user journeys using an identity experience framework, according to an example embodiment.

In FIG. 8, a diagram of identity policies 800 is shown, according to an example embodiment. Identity policies 800 includes a trustframework based identity policy 802 ("policy" 802), a customer/tenant base identity policy 804 ("policy" 804), and a customer/tenant application identity policy 806 ("policy" 806). As shown, policy 806 corresponds to a specific application of an application service provider (e.g., a customer or a tenant) and is modified/extended from policy 804. An application service provider may have one or more of policy 806 for different applications. Policy 806 may be authored by providers of the IEF, as described herein, and/or by administrators of the application service provider, and may be referred to as a relying party policy. In embodiments, policy 806 may specify the exact user journey, token semantics with respect to identity claims, and a token lifetime, as well configure the verification UI page customizations.

Policy 804 corresponds to a specific application service provider (e.g., a customer or a tenant) and is modified/extended from policy 802. Policy 804 may serve as a base policy for any number of applications of the application service provider, and in embodiments an application services provider (e.g., a customer or a tenant) may have a single policy 804. Policy 804 may be authored by providers of the IEF, as described herein, and/or by administrators of the application service provider. For instance, policy 804 may be modified/extended from policy 802 to include instantiations of specific social network IdP metadata and/or user attributes, as well as the relying party policies that are invoked by a relying party.

Policy 802 corresponds to the base trustframework identity policy, and may be referred to as a global trustframework policy. Policy 802 may be a base identity policy for business-to-consumer functionality, business-to-business functionality, business-to-employee functionality, and/or the like, and in embodiments, each of these functionalities may have its own base policy 802. Policy(ies) 802 may be authored by providers of the IEF, as described herein, and may provide all possible identity policy options for building blocks, claims providers, user journeys, etc.

Figure 9:
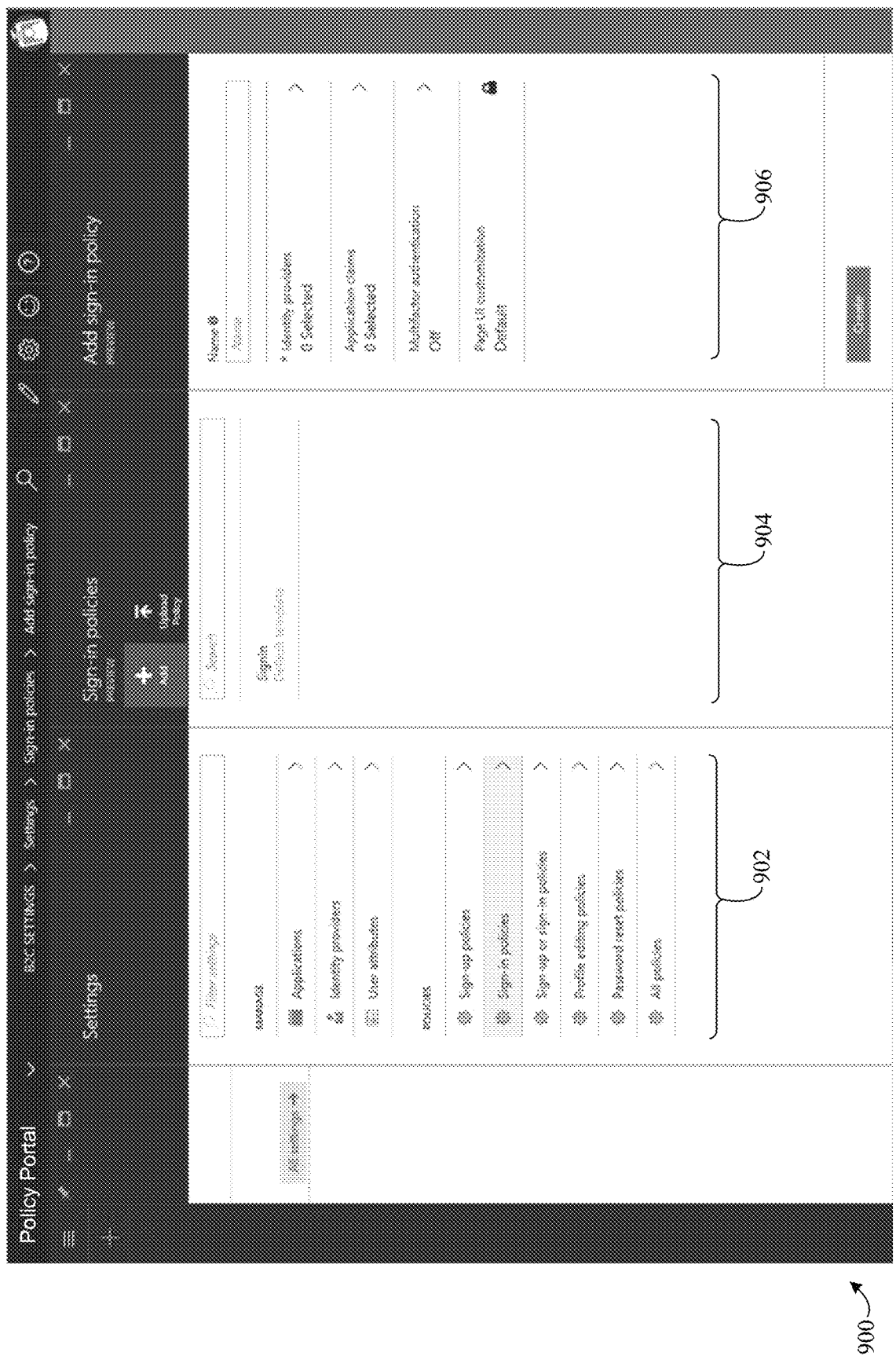
FIG. 9 shows a user interface for composable user journeys using an identity experience framework, according to an example embodiment.

In FIG. 9, a diagram of a policy portal UI 900 is shown, according to an example embodiment. Policy portal UI 900, as illustrated, includes a settings section 902, an edit section 904, and a creation section 906. Policy portal UI 900 may be utilized by application service providers (e.g., customers/tenants) to manage, modify, etc., identity policies, and also may be utilized by identity operators to create or add identity policies to the IEF. In embodiments, policy portal UI 900 may also include an interface portion for validating the identity polices described herein. For example, an interface portion may be provided to invoke identity policies and perform validation functions therefor.

Flowchart 700 is described as follows.

Flowchart 700 begins at step 702. In step 702, access is provided for customer entities to a base identity policy of the plurality of identity policies, the customer entities including one or more of at least one application service provider or at least one identity operator. For instance, in the described IEF, identity policy host 602 is configured to provide access to identity policies through policy portal 610 in FIG. 6 via policy portal UI 900 of FIG. 9. Such access may be provided to tenants/customers, e.g., application service providers, identity operators, etc., to modify a base identity policy such as policy 802 of FIG. 8. From step 702, flowchart 700 may proceed to step 704 and/or step 706.

In step 704, a customer entity base identity policy is received that includes one or more modifications to the base identity policy from which it derives. For example, as noted above, a based identity policy such as policy 802 may be extended or modified by a customer/tenant, etc., to serve as a customer/tenant base identity policy such as policy 804. In embodiments, access to identity policies is provided through policy portal 610 in FIG. 6 via policy portal UI 900 of FIG. 9. As shown in FIG. 8, policy 804 specifies policy 802 as its base policy from which it derives. According to embodiments herein for the IEF, the described trustframework policies support full inheritance with polymorphic references so a derived policy can leverage the entire functionality of the base/parent policy and then override, modify, and/or extend various specific aspects thereof. Policy 804 also specifies certain building blocks such as claims allowed by the policy including claims schema, and also claims providers allowed and their associated parameters (e.g., a client ID and secret reference).

The modifications, extensions, overrides, etc., that are applied for policy 804 may be applied via policy portal UI 900. For example, policy 802 may be loaded/referenced in policy portal UI 900, and from settings section 902, applications, identity providers, user attributes, and/or policies may be altered for creating/managing policy 804 as illustrated in FIG. 8. As shown in FIG. 9, "sign-in policies" is selected in settings section 902 causing sign-in policy properties and options to be populated in edit section 904. In edit section 904, options are provided for adding or uploading sign-in policies, and available sign-in policies are also displayed for management. As shown in FIG. 9, a default sign-in template is displayed in edit section 904, which may be modified or managed as required by the application service provider. In creation section 906, the current parameters for the policy under management are listed for reference, and an option for providing a policy name is included.

When the parameters for policy 804 are completed, policy 804 may be saved or created and then provided to, and received by, identity policy host 602 and/or memory 626 for invocation and later management.

In step 706, a customer entity application identity policy is received that includes one or more additional modifications to the customer entity base identity policy from which it derives, the one or more additional modifications being related to the application. For instance, an existing customer/tenant base identity policy such as policy 804 may be extended or modified by a customer/tenant, etc., to serve as a customer/tenant application identity policy such as policy 806. As shown in FIG. 8, policy 806 specifies policy 804 as its base policy from which it derives. Accordingly, per the IEF, policy 806 derives full inheritance with polymorphic references from policy 804 (e.g., for any modifications, extensions, overrides, etc.) which in turn inherits from policy 802. Policy 806 may then override, modify, and/or extend various specific aspects of policy 804 as required by a specific application. For example, policy 806 specifies certain content definition building blocks that are allowed, as well as user input and user directory details for claims providers. Policy 806 may also include specific user journey and relying party parameters to define a default user journey and output claims.

The modifications, extensions, overrides, etc., that are applied for policy 806 may be applied via policy portal UI 900 as similarly described above with respect to policy 804 in step 704.

When the parameters for policy 806 are completed, policy 806 may be saved or created and then provided to, and received by, identity policy host 602 and/or memory 626 for invocation and later management.

In step 708, received customer entity base identity policies or customer entity application identity policies are stored as a portion of the plurality of identity policies. For instance, received customer entity base identity policies (e.g., policy 804) or customer entity application identity policies (e.g., policy 806) may be stored in memory 626 as similarly described above with respect to policies/profiles 222 of system 200 in FIG. 2. Accordingly, subsequent to step 704 and/or step 706, policy selector 612 may find and retrieve policy 804 and/or policy 806 for execution by policy executor 614.

In embodiments, the functions and operations of policy portal 610 of FIG. 6, as exemplarily described above, may be performed locally at identity policy host 602 and/or remotely by application service providers, identity operators, etc., via policy portal 610 and policy portal UI 900.

B. Example Embodiments for Application Service Providers

As noted above, systems, apparatuses, and devices may be configured and enabled in various ways for user authentication via composable user journeys according to the IEF. The embodiments and techniques herein also provide IEF models for identity operators, application service providers, and application developers for composable user journeys. As previously described, identity policies may essentially act their own Security Token Service (STS). Accordingly, application integration for the embodiments and techniques herein may be performed as if integrating with a traditional STS where the identity policies can be invoked as such through authorization requests that invoke IEF. As application developers and application service providers familiar with standard identity protocols for STSs can leverage the benefits of the IEF with the same or similar semantics, seamless IEF integration is thus achieved.

Figure 11:
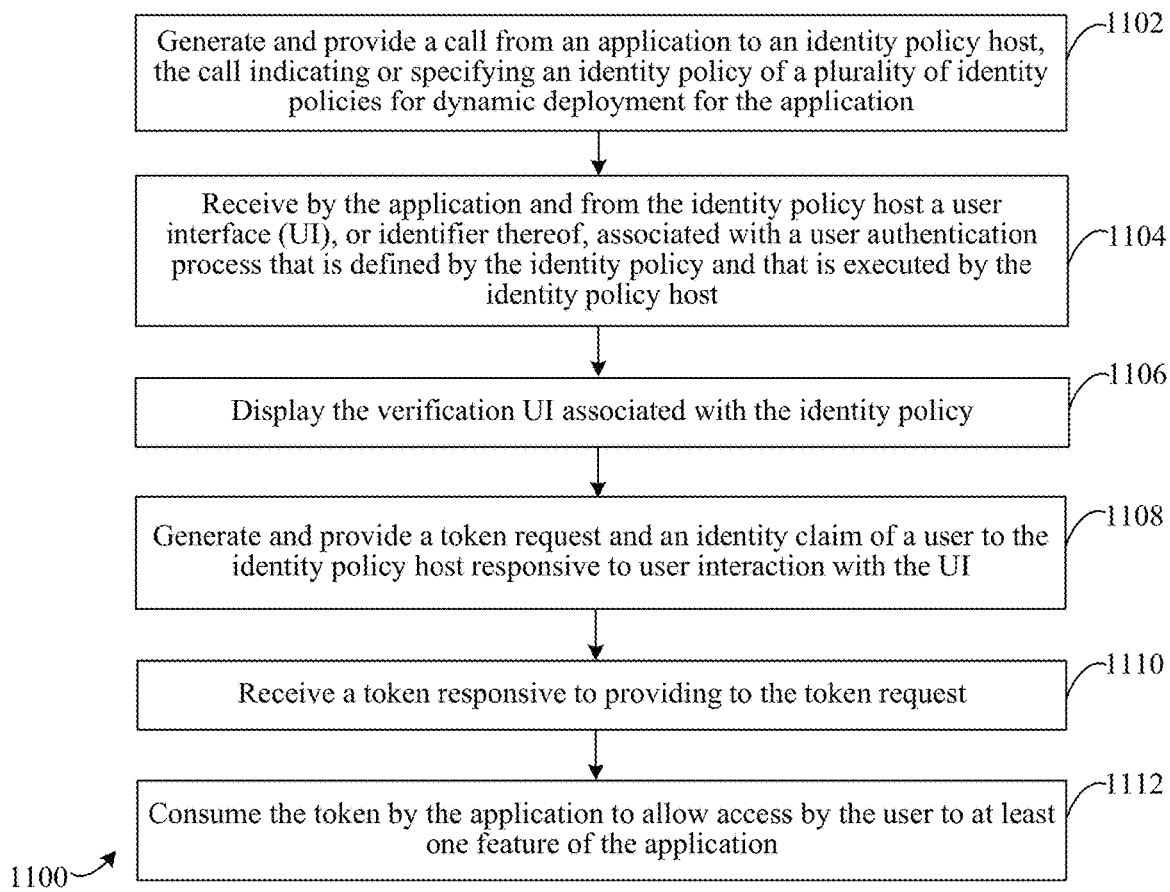
FIG. 11 shows a flowchart for composable user journeys using an identity experience framework, according to an example embodiment.
Figure 12:
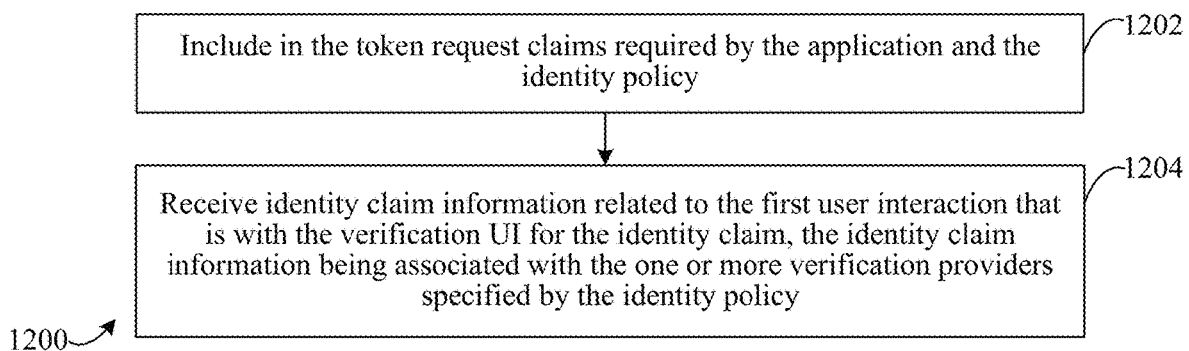
FIG. 12 shows a flowchart for composable user journeys using an identity experience framework, according to an example embodiment.

FIGS. 10, 11, and 12 will now be described in this context. For example, FIG. 10 is a block diagram of a system 1000, according to an embodiment. System 1000 may be a computing system for application development, deployment, and/or hosting by an application service provider utilizing the described IEF. As shown in FIG. 10, system 1000 includes a computing device 1002 which may be referred to as a computing system. System 400 may be a further embodiment of system 100 of FIG. 1, and computing device 1002 may be a further embodiment of user device 102 of FIG. 1.

In FIG. 10, computing device 1002 may be any type server computer or computing device, as mentioned elsewhere herein, or as otherwise known. As shown in FIG. 10, computing device 1002 includes one or more of a processor ("processor") 1004, one or more of a memory and/or other physical storage device ("memory") 1006, a network interface 1022, an input/output (I/O) interface 1024, and an application 1008. System 1000 may also include additional components (not shown for brevity and illustrative clarity) including, but not limited to, components and subcomponents of other systems herein, application development software/kits, etc., as well as those described below with respect to FIGS. 14 and 15 below, e.g., an operating system.

Processor 1004 and memory 1006 may respectively be any type of processor circuit or memory that is described herein, and/or as would be understood by a person of skill in the relevant art(s) having the benefit of this disclosure. Processor 1004 and memory 1006 may each respectively comprise one or more processors or memories, different types of processors or memories, remote processors or memories, and/or distributed processors or memories. Processor 1004 is configured to develop and/or execute computer program instructions such as but not limited to embodiments of application 1008, e.g., as computer program instructions (such as program logic), etc., as described herein, and memory 1006 is configured to store such computer program instructions, as well as to store other information and data described in this disclosure.

Network interface 1022 may be any type of wired and/or wireless network adapter, modem, etc., configured to enable computing device 1002 to communicate with other devices over a network, e.g., such as those shown in FIG. 1 over network 110, as well as system 200 of FIG. 2 and/or system 600 of FIG. 6.

I/O interface 1024 may support any number of input devices such as a mouse, a touch screen, a microphone, a camera, a physical keyboard, a trackball, etc., and one or more output devices such as a speaker, a display, and/or the like. Additional I/O devices supported by I/O interface 1024 are described below with respect to FIGS. 14 and 15.

Application 1008 may be any application under development and/or deployed by an application service provider and/or developers thereof. Application 1008 may be a website, a web application, a cloud-based utility, a stand-alone application that executes on a user device, and/or the like, that utilizes user authentication as described herein, e.g., according to the IEF. Application 1008 as illustrated, includes a plurality of components for performing the techniques described herein for composable user journeys according to the IEF, including dynamic calls for identity policies required by application 1008. As shown, application 1008 includes a communicator 1010, application code 1012, application UI controller 1014, and identity claim and token manager 1020. While shown separately for illustrative clarity, in embodiments, one or more of communicator 1010, application code 1012, application UI controller 1014, and/or identity claim and token manager 1020 may be included together with each other and/or as a part of other components of system 200 and/or application 1008.

It is also contemplated herein that one or more instances of application 1008 may be instantiated for multiple applications under development and/or multiple applications deployed by an application service provider.

Referring also now to FIGS. 11 and 12, in FIG. 11 a flowchart 1100 for composable user journeys according to the IEF is shown, according to an example embodiment, and in in FIG. 12 a flowchart 1200 for composable user journeys according to the IEF is shown, according to an example embodiment. In embodiments, the functions of flowchart 1100 and flowchart 1200 for composable user journeys for application authentication may be performed by a computing device/system of an application developer of an application service provider and/or by the application service provider during deployment of the application. For purposes of illustration, flowchart 1100 of FIG. 11 and flowchart 1200 of FIG. 12 are described with respect to system 1000 of FIG. 10 and its subcomponents including application 1008 and/or identity claim and token manager 1020. That is, system 1000 of FIG. 10 may perform various functions and operations in accordance with flowchart 1100 and/or flowchart 1200 for composable user journeys, including dynamic calls for identity policies and generation of identity claims and token requests. Further structural and operational examples will be apparent to persons skilled in the relevant art(s) based on the following description. Flowchart 1100 is described as follows.

Flowchart 1100 begins at step 1102. In step 1102, a call from an application to an identity policy host is generated and provided, the call specifying an identity policy of a plurality of identity policies for dynamic deployment for the application. For instance, application code 1012 may include policy code 1016 that is configured to make a call to an identity policy host (e.g., as in system 100 of FIG. 1, system 200 of FIG. 2, and/or system 600 of FIG. 6) for an identity policy. The identity policy may thus be dynamically invoked and deployed. In embodiments, for example, when a user initiates a sign-in or a sign-up process via a UI for the application, this may cause policy code 1016 to execute and issue the call to the identity policy host over a network for the identity policy specified in policy code 1016 and stored at the identity policy host. The call may be provided to the identity policy host via communicator 1010 and/or network interface 1022, and the call may include a policy identifier (ID) required by the application service provider for the application.

In step 1104, a user interface (UI) associated with a user authentication process, that is defined by the identity policy and that is executed by the identity policy host, or an identifier thereof, is received by the application from the identity policy host. For example, application UI controller 1014 of application 1008 in FIG. 10 may be configured to display to a received UI (e.g., as a policy UI 1018, also referred to herein as a verification UI) associated with the user authentication process defined by the identity policy for user interaction and provision of identity information. When a user interacts with the UI provided in step 1104 to enter identity information as prompted by the UI for the specified authentication, the application and/or the UI uses such information to generate a token request and an identity claim. In embodiments, a URI or URL for the verification UI may be received causing application UI controller 1014 to redirect to the URI or URL for the verification UI.

In step 1106, the verification UI associated with the identity policy is displayed. For instance, the verification UI may be displayed by computing device 1002, e.g., via application UI controller 1014. The verification UI may be displayed directly or via redirect by application UI controller 1014, according to embodiments.

In step 1108, a token request and an identity claim of a user are provided to the identity policy host responsive to user interaction with the UI. For instance, identity claim and token manager 1020 may be configured to provide the token request and the identity claim for user authentication to the identity policy host (e.g., via communicator 1010 and/or network interface 1022). The token request and the identity claim may be provided responsive to the user interacting with policy UI 1018 and entering identification information based on prompts for such information. The token request and the identity claim may be generated according to flowchart 1200 of FIG. 12.

Referring also now to FIG. 12, flowchart 1200 may be an embodiment of flowchart 1100 of FIG. 11, e.g., step 1108. In embodiments, one or more of the steps of flowchart 1200 may be performed prior to step 1108 as described above. Flowchart 1200 is described as follows.

Flowchart 1200 begins at step 1202. In step 1202, claims required by the application and the identity policy are included in the token request. For example, identity claim and token manager 1020 of FIG. 10 may be configured to include any claims required by the application and/or the identity policy in the token request. That is, if the application or the identity policy will require verification of any identity claim for authentication of the user to the application, identity claim and token manager 1020 assures that such claims are included in the token request. The claims may be determined by identity claim and token manager 1020 based on policy code 1016 and/or policy UI 1018, which may in turn derive the claims from the identity policy (e.g., specifying verification providers to be used against specific types of claims and/or user attributes, etc.).

In step 1204, identity claim information related to the first user interaction that is with the verification UI for the identity claim is received, where the identity claim information is associated with the one or more verification providers specified by the identity policy. For instance, identity claim and token manager 1020 may be configured to include any claim information required by the application and/or the identity policy in the identity claim. The claim information may be determined by identity claim and token manager 1020 based on policy code 1016 and/or policy UI 1018, which may in turn derive the requisite claim information from the identity policy (e.g., specifying verification providers to be used against specific types of claims and/or user attributes, etc.).

Referring back to flowchart 1100, in step 1110, a token is received responsive to providing to the token request. For example, application 1008 may receive a token generated by the identity policy host responsive to the token request being provided. In embodiments, the token may be received via network interface 1022 and/or communicator 1010. Application 1008 may be configured to provide the received token to identity claim and token manager 1020 for consumption thereof.

In step 1112, the token is consumed by the application to allow access by the user to at least one feature of the application. For instance, identity claim and token manager 1020 of application 1008 may be configured to consume the token. The token may be generated by the identity policy host according to the identity policy specified in the call in step 1108 and may include all claims, as verified, required by application 1008 to authenticate the user and allow access by the user to feature(s) of the application.

Figure 13:
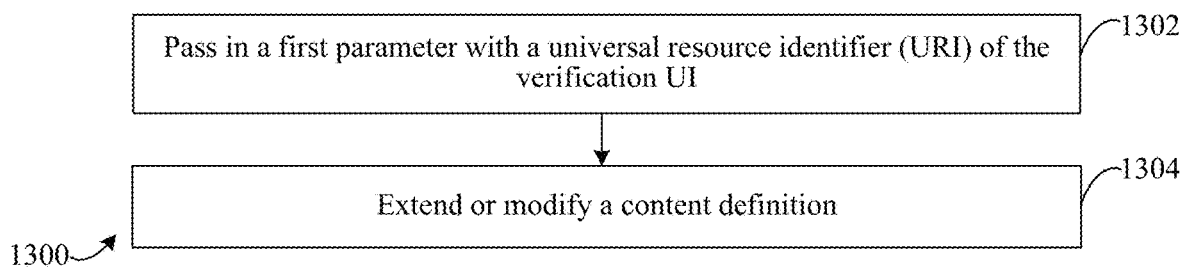
FIG. 13 shows a flowchart for composable user journeys using an identity experience framework, according to an example embodiment.

Turning now to FIG. 13, a flowchart 1300 for composable user journeys according to the IEF is shown, according to an example embodiment. In embodiments, the functions of flowchart 1300 for composable user journeys for application authentication may be performed by a computing device/system of an application developer of an application service provider and/or by the application service provider during deployment of the application. For purposes of illustration, flowchart 1300 of FIG. 13 is described with respect to system 1000 of FIG. 10 and its subcomponents. That is, system 1000 of FIG. 10 may perform various functions and operations in accordance with flowchart 1300 for composable user journeys, including modifying a verification/policy UI according to preferences of an application service provider for an application. Further structural and operational examples will be apparent to persons skilled in the relevant art(s) based on the following description. Flowchart 1300 is described as follows.

Flowchart 1300 beings at step 1302. In step 1302, a first parameter is passed in with a universal resource identifier (URI) of the verification UI. For example, application code 1012 and/or application UI controller 1014 may be configured to insert, or pass in, one or more parameters with the URI for policy UI 1018 (i.e., the verification UI) for bringing up policy UI 1018. In one embodiment, e.g., for an open ID connect request, the passed parameter may indicate a business-to-consumer sign-up process and policy, such as:

"https://login.hostdomainOnline.com/
<yourtenant>.onHostDomain.com/oauth2/v  2.0/
authorize?client_id=cc5e4187-44e6-40a7-
64156E0bb24f32&  redirect_uri=https:%2f%2fmysite.
com&response_type=id_token&scope=email+0  pen-
id&response_mode=query&nonce=H3qvRR56JK39&
p=B2C_1_signup", where "p=B2C_1_signup" is the parameter passed in with the URI. Accordingly, the application developer and/or the application service provider may specify a signup policy according to a desired identity policy provided by the identity host provider.

In step 1304, a content definition is extended or modified. For instance, as noted above, content definitions define user experience elements and are referenced by any orchestration step that provides a UI or any verification provider showing a UI. When policy UI 1018 is provided to application 1008, one or more aspects to the content definition for policy UI 1018 may be extended or modified, including by not limited to, HTML code, SML page templates, e.g., XML files, CSS, and/or the like, to alter the appearance or customer feel of policy UI 1018. In embodiments, an application service provider, including application developers thereof, and/or identity operators on behalf of application service providers, may author, extend, and/or modify content definitions and/or associated documents (or portions thereof), examples of which are provided immediately above.

It is contemplated herein that step 1302 and/or step 1304 may not be performed in some embodiments, and that these steps may be performed in any order, or concurrently, in some embodiments.

III. Example Mobile Device Implementation

Portions of system 100 of FIG. 1, system 200 of FIG. 2, system 600 of FIG. 6, policy portal UI 900 of FIG. 9, system 1000 of FIG. 10, along with any components and/or sub-components thereof, as well as the flowcharts/flow diagrams described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

FIG. 9 is a block diagram of an exemplary mobile system 900 that includes a mobile device 902 that may implement embodiments described herein. For example, mobile device 902 may be used to implement any system, client, or device, or components/subcomponents thereof, in the preceding sections. As shown in FIG. 9, mobile device 902 includes a variety of optional hardware and software components. Any component in mobile device 902 can communicate with any other component, although not all connections are shown for ease of illustration. Mobile device 902 can be any of a variety of computing devices (e.g., cell phone, smart phone, handheld computer, Personal Digital Assistant (PDA), etc.) and can allow wireless two-way communications with one or more mobile communications networks 904, such as a cellular or satellite network, or with a local area or wide area network.

Mobile device 902 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components of mobile device 902 and provide support for one or more application programs 914 (also referred to as "applications" or "apps"). Application programs 914 may include common mobile computing applications (e.g., e-mail applications, calendars, contact managers, web browsers, messaging applications) and any other computing applications (e.g., word processing applications, mapping applications, media player applications).

Mobile device 902 can include memory 920. Memory 920 can include non-removable memory 922 and/or removable memory 924. Non-removable memory 922 can include RAM, ROM, flash memory, a hard disk, or other well-known memory devices or technologies. Removable memory 924 can include flash memory or a Subscriber Identity Module (SIM) card, which is well known in GSM communication systems, or other well-known memory devices or technologies, such as "smart cards." Memory 920 can be used for storing data and/or code for running operating system 912 and application programs 914. Example data can include web pages, text, images, sound files, video data, or other data to be sent to and/or received from one or more network servers or other devices via one or more wired or wireless networks. Memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 920. These programs include operating system 912, one or more application programs 914, and other program modules and program data. Examples of such application programs or program modules may include, for example, computer program logic (e.g., computer program code or instructions) for implementing one or more of system 100 of FIG. 1, system 200 of FIG. 2, system 600 of FIG. 6, policy portal UI 900 of FIG. 9, system 1000 of FIG. 10, along with any components and/or subcomponents thereof, as well as the flowcharts/flow diagrams described herein and/or further examples described herein.

Mobile device 902 can support one or more input devices 930, such as a touch screen 932, a microphone 934, a camera 936, a physical keyboard 938 and/or a trackball 940 and one or more output devices 950, such as a speaker 952 and a display 954. Other possible output devices (not shown) can include piezoelectric or other haptic output devices. Some devices can serve more than one input/output function. For example, touch screen 932 and display 954 can be combined in a single input/output device. Input devices 930 can include a Natural User Interface (NUI).

Wireless modem(s) 960 can be coupled to antenna(s) (not shown) and can support two-way communications between processor 910 and external devices, as is well understood in the art. Modem(s) 960 are shown generically and can include a cellular modem 966 for communicating with the mobile communication network 904 and/or other radio-based modems (e.g., Bluetooth 964 and/or Wi-Fi 962). At least one of wireless modem(s) 960 is typically configured for communication with one or more cellular networks, such as a GSM network for data and voice communications within a single cellular network, between cellular networks, or between the mobile device and a public switched telephone network (PSTN).

Mobile device 902 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components of mobile device 902 are not required or all-inclusive, as any components can be deleted and other components can be added as would be recognized by one skilled in the art.

In an embodiment, mobile device 902 is configured to implement any of the above-described features of flowcharts herein. Computer program logic for performing any of the operations, steps, and/or functions described herein may be stored in memory 920 and executed by processor 910.

IV. Example Processor-Based Computer System Implementation

As noted herein, the embodiments and techniques described herein, including system 100 of FIG. 1, system 200 of FIG. 2, system 600 of FIG. 6, policy portal UI 900 of FIG. 9, system 1000 of FIG. 10, along with any components and/or subcomponents thereof, as well as the flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC).

FIG. 10 depicts an example processor-based computer system 1000 that may be used to implement various example embodiments described herein. For example, system 1000 may be used to implement any server, host, system, device (e.g., a remote device), mobile/personal device, etc., as described herein. System 1000 may also be used to implement any of the steps of any of the flowcharts, as described herein. The description of system 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing system 100 of FIG. 1, system 200 of FIG. 2, system 600 of FIG. 6, policy portal UI 900 of FIG. 9, system 1000 of FIG. 10, along with any components and/or subcomponents thereof, as well as the flowcharts/flow diagrams described herein and/or further examples described herein.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media and modulated data signals (do not include communication media and modulated data signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Example Advantages and Embodiments

As described, systems and devices embodying the techniques herein may be configured and enabled in various ways to perform their respective functions. In embodiments, one or more of the steps or operations of any flowchart and/or flow diagram described herein may not be performed. Moreover, steps or operations in addition to or in lieu of those in any flowchart and/or flow diagram described herein may be performed. Further, in examples, one or more operations of any flowchart and/or flow diagram described herein may be performed out of order, in an alternate sequence, or partially (or completely) concurrently with each other or with other operations.

As noted above, according to embodiments, applications and services hosted by application/service providers may be accessible via network, e.g., online via the Internet, through other networks, etc., and may be cloud-based applications and services. As will be understood by one of skill in the relevant art(s) having the benefit of this disclosure, application service providers with applications and/or services hosted by servers "in the cloud" may be tenants of the cloud hosting service which may comprise the described IEF. Alternately, application service providers with applications and/or services hosted by servers of the application service providers may not be cloud service tenants may still be customers/consumers of the cloud service IEF.

Additionally, by the novel and unique locations of the identity policy host and systems for implementing the described IEF herein sit centrally between application service providers, identity operators, and verification providers. Accordingly, user authentication and user journeys for application-specific identity policies, which may be dynamically invoked during the authentication process, are implemented specifically to application service provider specifications on a per-application basis. This provides flexibility to properly authenticate users for any application using policies for any identity operators as well as any verification providers required via specific user journeys using the IEF.

The techniques and embodiments herein provide for integration and centralization between application service providers, identity operators, and verification providers, e.g., effectively into a single, overall IEF, and such a novel architecture has additional advantages. For instance, in the described techniques and embodiments, each authentication request is processed in the context of a trustframework policy that defines a user journey. There is no identity logic outside of what is declared in the identity policies and implemented by the specific claims providers called out in the policy per the application service providers. In other words, identity information is confined within a trusted, secure environment for user journeys, to wit: the IEF.

Furthermore, the described IEF provides for leveraging the functionality of the trustframework for most need of the customers/consumers, but the customers/consumers can easily step outside the provided IEF options to accomplish a more customized user journey while still maintaining the full suite of functions provided in the trustframework policies. This extensibility has no impact on the application developer model. Moreover, the IEF provides a scalable platform in which the framework is configured to evolve to new identity policies given the modular nature of identity policy and verification provider within the IEF.

Still further, other advantages to the application developer using an identity policy are provided. For instance, application developers and application service providers can easily perform "A/B" testing (or split testing) of various user journeys, and be in control of their identity system as much as they would have been when using a purpose-built system but with additional options and flexibility for changes and growth.

Improved security for sensitive data is also provided via the described IEF. Many industries with vertical systems need to comply with specific regulations, e.g., applications dealing with financial transactions, applications dealing with patient health data, applications dealing with governments or defense, etc. The IEF described herein and its associated trustframework policies provide the ability for various applications use specific, secure policies, and thereby be compliant, without separate, purpose-built identity solutions for each system. In the context of the business-to-consumer functionality, the disclosed IEF and trustframework enables turnkey functionality required by the business-to-consumer SKU. For example, an application developer/application service provider may integrate an application with a business-to-consumer stock policy to implement sign-up and sign-in functionalities. In another example, a user's authentication level may be altered dynamically based on different user factors. As a non-limiting, illustrative example scenario, a sign-in and then step-up to a sign-in with multifactor authentication may be implemented for government applications, as well as financial- and medical-related user journeys. As yet another example scenario, a progressive collection of user attributes may implemented where traders are required to step up authentication when placing a trade over a specified dollar amount. As still another example, an application developer/application service provider may configure what claims an application receives as part of the token, the "client_id/client_secret" to use when federating with Facebook®, attributes to collect from users during sign-up, the use of MFA, etc.

In embodiments of the described IEF, all aspects of authentication may defined in a policy (and its parent policies), such that no aspects are hardcoded outside of the policies themselves.

The additional examples and embodiments described in this Section may be applicable to examples disclosed in any other Section or subsection of this disclosure.

A system is described herein. The system may be configured and enabled in various ways to provide composable user journeys for user authentication, and the system may perform its functions according to an identity experience framework, as described herein. The system includes a memory(ies) configured to store program logic, and also includes a processor(s) configured to access the memory and to execute the program logic. In the system, the program logic includes communicator logic and policy executor logic. The communicator logic configured to receive a call from an application, the call indicating or specifying an identity policy that is one of a plurality of identity policies for dynamic deployment by the application, and to receive a token request and an identity claim responsive to user interaction with a user interface (UI) associated with the identity policy and provided to the application. The policy executor logic is configured to execute a user authentication process that is defined by the identity policy and that includes providing the UI to the application. The policy executor logic is also configured to verify the identity claim and provide a token to the application for consumption, via the communicator logic, to complete the token request.

In an embodiment of the system, the policy executor logic, to verify the identity claim, is configured to provide the identity claim to a verification provider according to the identity policy, receive a response claim from the verification provider, and verify the identity claim against the response claim.

In an embodiment of the system, the verification provider is one or more of an identity provider, an attribute provider, a directory provider, a multi-factor authentication (MFA) provider, an email validation provider, or self-asserted attribute provider. In embodiments, a verification provider may be a new verification provider that follows an existing protocol(s) to allow it to be invoked.

In an embodiment of the system, the policy executor logic is configured to transform the identity claim to a transformed claim, using at least one parameter associated with the claim, prior to providing the identity claim to the verification provider according to the identity policy, and provide the transformed claim to the verification provider instead of the identity claim. In the embodiment, the policy executor logic is configured to transform the response claim, that is based on the transformed claim, received from the verification provider prior to verifying the identity claim.

In an embodiment of the system, the at least one memory is configured to store the plurality of identity policies, at least one of the plurality of identity policies being provided to the at least one memory from a remote identity operator.

In an embodiment of the system, the identity policy is a child identity policy comprising a base parent identity policy and one or more changes thereto specified and/or made by an application service provider that provides the application.

In an embodiment, the system includes policy portal logic that is configured to provide access for customer entities to a base identity policy of the plurality of identity policies, the customer entities including one or more of at least one application service provider or at least one identity operator. In the embodiment, the policy portal logic is configured to perform one or more of: receive a customer entity base identity policy that includes one or more modifications to the base identity policy from which it derives; or receive a customer entity application identity policy that includes one or more additional modifications to the customer entity base identity policy from which it derives, the one or more additional modifications being related to the application. In the embodiment, the policy portal logic is configured to store received customer entity base identity policies or customer entity application identity policies as a portion of the plurality of identity policies.

In an embodiment of the system, the communicator logic and the policy executor logic comprise a multi-sided identity experience framework configured to support a plurality of remote identity operators, a plurality of remote verification providers, and a plurality of remote application service providers for user authentication to applications.

In an embodiment of the system, the UI is defined by the identity policy that is called by the application and is configured in accordance with one or more verification providers specified by the identity policy.

In an embodiment of the system, the policy executor logic is configured to execute the user authentication process at least in part as a security token service (STS), and to mint the token according to the STS and the token request to include claims required by the application and the identity policy.

A method is also described herein. The method may include steps for providing a composable user journey for user authentication, according to an identity experience framework, as described herein. The method may be implemented by a computing system that comprises a multi-sided identity experience framework configured to support a plurality of remote identity operators, a plurality of remote verification providers, and a plurality of remote application service providers for user authentication to applications. The method includes receiving a call from an application, the call indicating or specifying an identity policy of a plurality of identity policies for dynamic deployment by the application, and executing a user authentication process that is defined by the identity policy and that includes providing a user interface (UI) defined by the identity policy that is called by the application and that is configured in accordance with one or more verification providers specified by the identity policy. The method also includes receiving a token request and an identity claim responsive to user interaction with the UI at the application, verifying the identity claim, and providing a token to the application for consumption to complete the token request.

In an embodiment, the method includes providing the identity claim to a verification provider according to the identity policy, and receiving a response claim from the verification provider. In the embodiment, verifying the identity claim includes verifying the identity claim against the response claim.

In an embodiment of the method, the verification provider is one or more of an identity provider, an attribute provider, a directory provider, a multi-factor authentication (MFA) provider, an email validation provider, or self-asserted attribute provider. In embodiments, a verification provider may be a new verification provider that follows an existing protocol(s) to allow it to be invoked.

In an embodiment, the method includes storing the plurality of identity policies in at least one memory of the computing system, wherein one of the plurality of identity policies is provided to the at least one memory from a remote identity operator.

In an embodiment, the method, the identity policy is a child identity policy comprising a base parent identity policy and one or more changes thereto specified and/or made by an application service provider that provides the application.

In an embodiment, the method includes executing the user authentication process at least in part as a security token service (STS), and minting the token according to the identity policy and the token request to include claims required by the application and the identity policy.

A computer-readable storage medium comprising computer-executable instructions that, when executed by at least one processor, perform a method is also described herein. The method may include steps for providing a composable user journey for user authentication, according to an identity experience framework, as described herein. The method may be implemented by a computing system that embodies or accepts the computer-readable storage medium. The computing system may comprise a multi-sided identity experience framework configured to support a plurality of remote identity operators, a plurality of remote verification providers, and a plurality of remote application service providers for user authentication to applications. In an embodiment, the method includes receiving a call from an application, the call indicating or specifying an identity policy of a plurality of identity policies for dynamic deployment by the application, and executing a user authentication process that is defined by the identity policy and that includes providing a user interface (UI) associated with the identity policy to the application. The method also includes receiving a token request and an identity claim responsive to user interaction with the UI at the application, verifying the identity claim, and providing a token to the application for consumption to complete the token request.

In an embodiment of the computer-readable storage medium, the method includes providing the identity claim to a verification provider according to the identity policy, and receiving a response claim from the verification provider. In the embodiment, verifying the identity claim includes verifying the identity claim against the response claim.

In an embodiment of the method, the verification provider is one or more of an identity provider, an attribute provider, a directory provider, a multi-factor authentication (MFA) provider, an email validation provider, or self-asserted attribute provider. In embodiments, a verification provider may be a new verification provider that follows an existing protocol(s) to allow it to be invoked.

In an embodiment of the computer-readable storage medium, the method includes storing the plurality of identity policies in at least one memory, and one of the plurality of identity policies is provided to the at least one memory from a remote identity operator.

In an embodiment of the computer-readable storage medium, the identity policy is a child identity policy comprising a base parent identity policy and one or more changes thereto made specified and/or by an application service provider that provides the application.

In an embodiment of the computer-readable storage medium, the method includes executing the user authentication process at least in part as a security token service (STS), and minting the token according to the identity policy and the token request to include claims required by the application and the identity policy.

Another system is also described herein. The system may be configured and enabled in various ways to provide composable user journeys for user authentication, and the system may perform its functions according to an identity experience framework, as described herein. The system may interact with a multi-sided identity experience framework configured to support a plurality of remote identity operators, a plurality of remote verification providers, and a plurality of remote application service providers for user authentication to applications. The system includes at least one memory configured to store program logic for an application, and also includes at least one processor configured to access the at least one memory and to execute the program logic. In the system, the program logic includes user interface (UI) logic, policy logic, and identity claim and token logic. The UI logic is configured to display a verification UI associated with an identity policy. The policy logic is configured to generate a call to an identity policy host, the call indicating or specifying the identity policy, that is one of a plurality of identity policies, for dynamic deployment of the verification UI for the application. The identity claim and token logic is configured to generate a token request and an identity claim of a user responsive to a first user interaction that is with the verification UI, and consume a token from the identity policy host subsequent to generating the token request to allow access by the user to at least one feature of the application.

In an embodiment of the system, the identity policy is a child identity policy comprising a base parent identity policy and one or more changes thereto specified and/or made by an application service provider that provides the application, or is a base parent identity policy of the identity policy host. In the embodiment where the identity policy is the child identity policy, the one or more changes include a content definition, identity claims allowed, a verification provider type, or a relying party attribute In an embodiment of the system, the verification UI is defined by the identity policy that is called by the application and is configured in accordance with one or more verification providers specified by the identity policy.

In an embodiment of the system, the identity claim and token logic, to generate the token request and the identity claim, is configured to include in the token request claims required by the application and the identity policy, and receive identity claim information related to the first user interaction that is with the verification UI for the identity claim, the identity claim information being associated with the one or more verification providers specified by the identity policy.

In an embodiment of the system, the UI logic is configured to generate and display an application UI, and the policy logic is executed by the application to generate the call responsive to a second user interaction that is with the application UI.

In an embodiment of the system, the UI logic, to modify the verification UI, is configured to perform one or more of pass in a first parameter with a universal resource identifier (URI) of the verification UI, extend a content definition, or modify a content definition.

Another method is also described herein. The method may include steps for providing a composable user journey for user authentication, according to an identity experience framework, as described herein. The method may be implemented by a computing system of an application service provider of an application that interacts with a multi-sided identity experience framework configured to support a plurality of remote identity operators, a plurality of remote verification providers, and a plurality of remote application service providers for user authentication to applications. The method includes generating and providing a call to an identity policy host, the call indicating or specifying an identity policy, that is one of a plurality of identity policies, for dynamic deployment of a verification user interface (UI) for the application, and displaying the verification UI associated with the identity policy. The method also includes generating and providing a token request and an identity claim of a user responsive to a first user interaction that is with the verification UI, and consuming a token from the identity policy host subsequent to generating the token request to allow access by the user to at least one feature of the application.

In an embodiment of the method, the identity policy is a child identity policy comprising a base parent identity policy and one or more changes thereto specified and/or made by the application service provider that provides the application, or is a base parent identity policy of the identity policy host. In the embodiment where the identity policy is the child identity policy, the one or more changes include a content definition, identity claims allowed, a verification provider type, or a relying party attribute.

In an embodiment of the method, the verification UI is defined by the identity policy that is called by the application and is configured in accordance with one or more verification providers specified by the identity policy.

In an embodiment of the method, generating the token request and the identity claim includes including in the token request claims required by the application and the identity policy, and receiving identity claim information related to the first user interaction that is with the verification UI for the identity claim, the identity claim information being associated with the one or more verification providers specified by the identity policy.

In an embodiment, the method includes generating and displaying an application UI, and generating the call responsive to a second user interaction that is with the application UI.

In an embodiment, the method includes modifying the verification UI according to one or more of passing in a first parameter with a universal resource identifier (URI) of the verification UI, extending a content definition, or modifying a content definition.

In an embodiment, the method includes receiving the verification UI responsive to the call, and receiving the token responsive to providing to the token request.

Another computer-readable storage medium comprising computer-executable instructions that, when executed by at least one processor, perform a method is also described herein. The method may include steps for providing a composable user journey for user authentication, according to an identity experience framework, as described herein. The method may be implemented by a computing system that embodies or accepts the computer-readable storage medium. The computing system may interact with a multi-sided identity experience framework configured to support a plurality of remote identity operators, a plurality of remote verification providers, and a plurality of remote application service providers for user authentication to applications. In an embodiment, the method includes generating and providing a call to an identity policy host, the call indicating or specifying an identity policy, that is one of a plurality of identity policies, for dynamic deployment of a verification user interface (UI) for the application, and receiving the verification UI, or an identifier thereof, responsive to the call. The method also includes displaying the verification UI associated with the identity policy, and generating and providing a token request and an identity claim of a user responsive to a first user interaction that is with the verification UI. The method further includes receiving the token responsive to providing to the token request, and consuming a token from the identity policy host subsequent to generating the token request to allow access by the user to at least one feature of the application.

In an embodiment of the method, the identity policy is a child identity policy comprising a base parent identity policy and one or more changes thereto specified and/or made by the application service provider that provides the application, and wherein the one or more changes include a content definition, identity claims allowed, a verification provider type, or a relying party attribute, or is a base parent identity policy of the identity policy host.

In an embodiment of the method, the verification UI is defined by the identity policy that is called by the application and is configured in accordance with one or more verification providers specified by the identity policy.

In an embodiment of the method, generating the token request and the identity claim includes including in the token request claims required by the application and the identity policy, and receiving identity claim information related to the first user interaction that is with the verification UI for the identity claim, the identity claim information being associated with the one or more verification providers specified by the identity policy.

In an embodiment, the method includes passing in a first parameter with a universal resource identifier (URI) of the verification UI, extending a content definition, or modifying a content definition.

VI. Conclusion

While various examples of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described examples, but should be defined only in accordance with the following claims and their equivalents.

What is claimed is:

1. An application service provider device remote to an interface and an identity policy host, the application service provider device comprising:

a processor; and
memory storing program instructions comprising an application, the program instructions structured to cause the processor to:
provide, by the application executing on the application service provider device, a call over a network to the identity policy host in response to user interaction with the interface, the call indicating an identity policy of a plurality of identity policies for dynamic deployment on behalf of the application;
receive, by the program instructions executed by the processor and from the identity policy host over the network, a user interface (UI) defined by the indicated identity policy;
provide, by the program instructions executed by the processor, the UI to the interface;
responsive to additional user interaction with the UI, provide, by the application, a token request and an identity claim over the network to the identity policy host;
receive, by the application, a token from the identity policy host over the network, the token configured to enable access to the application; and
consume, by the application, the token to allow access to the application.

2. The application service provider device of claim 1, wherein the indicated identity policy is a default policy and the call indicates the default policy by not specifying a policy.

3. The application service provider device of claim 1, wherein the program instructions are further structured to cause the processor to:
cause policy code to execute and generate the call, the policy code specifying the indicated identity policy.

4. The application service provider device of claim 1, wherein to provide a token request and an identity claim, the program instructions are further structured to cause the processor to:
determine claim information based on policy code of the application or the UI; and
include the determined claim information in the identity claim.

5. The application service provider device of claim 1, wherein the program instructions are further structured to cause the processor to:
modify the UI according to at least one of:
passing in a first parameter with a universal resource identifier (URI) of the UI,
extending a content definition, or
modifying a content definition.

6. The application service provider device of claim 1, wherein the UI is configured in accordance with a verification provider specified by the indicated identity policy.

7. The application service provider device of claim 1, wherein the indicated identity policy is a child identity policy comprising a base parent identity policy and a change thereto specified by an application service provider associated with the application service provider device.

8. A method implemented by an application executing on an application service provider device, the application service provider device remote to an interface and an identity policy host, the method comprising:
providing, by the application, a call over a network to the identity policy host in response to user interaction with the interface, the call indicating an identity policy of a plurality of identity policies for dynamic deployment on behalf of the application;

receiving, by the application and from the identity policy host over the network, a user interface (UI) defined by the indicated identity policy;

providing, by the application, the UI to the interface;

responsive to additional user interaction with the UI, providing, by the application, a token request and an identity claim over the network to the identity policy host;

receiving, by the application and from the identity policy host over the network, a token configured to enable access to the application; and consuming, by the application, the token to allow access to the application.

9. The method of claim 8, wherein the indicated identity policy is a default policy and the call indicates the default policy by not specifying a policy.

10. The method of claim 8, further comprising:

causing policy code to execute and generate the call, the policy code specifying the indicated identity policy.

11. The method of claim 8, wherein said providing a token request and an identity claim comprises:

determining claim information based on policy code of the application or the UI; and including the determined claim information in the identity claim.

12. The method of claim 8, further comprising:

modifying the UI according to at least one of:
passing in a first parameter with a universal resource identifier (URI) of the UI,
extending a content definition, or
modifying a content definition.

13. The method of claim 8, wherein the UI is configured in accordance with a verification provider specified by the indicated identity policy.

14. The method of claim 8, wherein the indicated identity policy is a child identity policy comprising a base parent identity policy and a change thereto specified by an application service provider associated with the application service provider device.

15. A method implemented by a computing system comprising an identity experience framework, the method comprising:

receiving a call over a network from an application in response to user interaction with an interface, the application executing on an application service provider device remote to the computing system and the interface, the call indicating an identity policy of a plurality of identity policies for dynamic deployment on behalf of the application;

subsequent to said receiving the call, providing a user interface (UI) to the application over the network based on the indicated identity policy, the UI defined by the indicated identity policy;

responsive to additional user interaction with the UI, receiving a token request and an identity claim over the network from the application;

subsequent to verification of the identity claim, providing a token configured to enable access to the application over the network to complete the token request.

16. The method of claim 15, further comprising:

utilizing a default identity policy as the indicated identity policy based on the call not specifying a policy.

17. The method of claim 15, wherein the call is generated based on policy code of the application that specifies the indicated identity policy.

18. The method of claim 15, wherein the identity claim comprises claim information determined based on policy code of the application or the UI.

19. The method of claim 15, wherein the method further comprises:

providing the identity claim to a verification provider according to the indicated identity policy;

receiving a response claim from the verification provider; and verifying the identity claim against the response claim.

20. The method of claim 15, further comprising:

storing the plurality of identity policies in a memory of the computing system, wherein one of the plurality of identity policies is provided to the memory from a remote identity operator.

* * * * *